United States Patent
Hanayama et al.

(10) Patent No.: US 8,768,158 B2
(45) Date of Patent: Jul. 1, 2014

(54) IMAGE PICKUP APPARATUS, FLASH APPARATUS, AND CAMERA SYSTEM

(75) Inventors: Tatsuya Hanayama, Yokohama (JP); Kei Tohyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/012,271

(22) Filed: Jan. 24, 2011

(65) Prior Publication Data
US 2011/0188845 A1    Aug. 4, 2011

(30) Foreign Application Priority Data

Feb. 1, 2010   (JP) ................................. 2010-020364
Feb. 1, 2010   (JP) ................................. 2010-020365

(51) Int. Cl.
*G03B 15/03*   (2006.01)

(52) U.S. Cl.
USPC .......................................................... 396/155

(58) Field of Classification Search
USPC ............................. 396/56, 155; 340/1.1, 4.42
See application file for complete search history.

(56) References Cited

U.S. PATENT DOCUMENTS

| | | | | |
|---|---|---|---|---|
| 6,047,138 | A * | 4/2000 | Teremy | 396/158 |
| 6,922,528 | B2 * | 7/2005 | Okabe | 396/157 |
| 7,359,632 | B2 * | 4/2008 | Tohyama | 396/155 |
| 7,480,450 | B2 * | 1/2009 | Kobayashi et al. | 396/56 |
| 7,834,931 | B2 * | 11/2010 | Tanaka et al. | 348/371 |
| 2002/0064384 | A1 * | 5/2002 | Kawasaki et al. | 396/157 |
| 2002/0127019 | A1 * | 9/2002 | Ogasawara | 396/661 |
| 2004/0179832 | A1 | 9/2004 | Okabe | |
| 2006/0284996 | A1 * | 12/2006 | Kanai et al. | 348/294 |
| 2008/0007627 | A1 * | 1/2008 | Huang | 348/211.9 |
| 2009/0135262 | A1 | 5/2009 | Ogasawara | |
| 2009/0185797 | A1 | 7/2009 | Ogasawara | |
| 2009/0213247 | A1 * | 8/2009 | Tanaka et al. | 348/240.99 |

FOREIGN PATENT DOCUMENTS

| | | |
|---|---|---|
| JP | 07-281283 A | 10/1995 |
| JP | 2001-242511 A | 9/2001 |
| JP | 2002-318413 A | 10/2002 |
| JP | 2005-134850 A | 5/2005 |
| JP | 2007-053653 A | 3/2007 |
| JP | 2008-102337 A | 5/2008 |

* cited by examiner

*Primary Examiner* — W B Perkey
*Assistant Examiner* — Linda B Smith
(74) *Attorney, Agent, or Firm* — Canon USA, Inc. IP Division

(57) ABSTRACT

An image pickup apparatus configured to execute wireless communication with a flash apparatus by radio waves via a communication unit includes a signal output unit configured to output a flash start signal to the flash apparatus, a flash detection unit configured to detect a flash emitted by the flash apparatus according to the flash start signal, an acquisition unit configured to acquire a time difference between a predetermined reference timing and a timing at which the flash is regarded to have been emitted by the flash apparatus according to a result of detection by the flash detection unit, and a control unit configured to control at least one of a timing of output of the flash start signal to the flash apparatus by the signal output unit and a timing of start of an operation executed corresponding to the flash by the flash apparatus according to the time difference acquired by the acquisition unit.

14 Claims, 22 Drawing Sheets

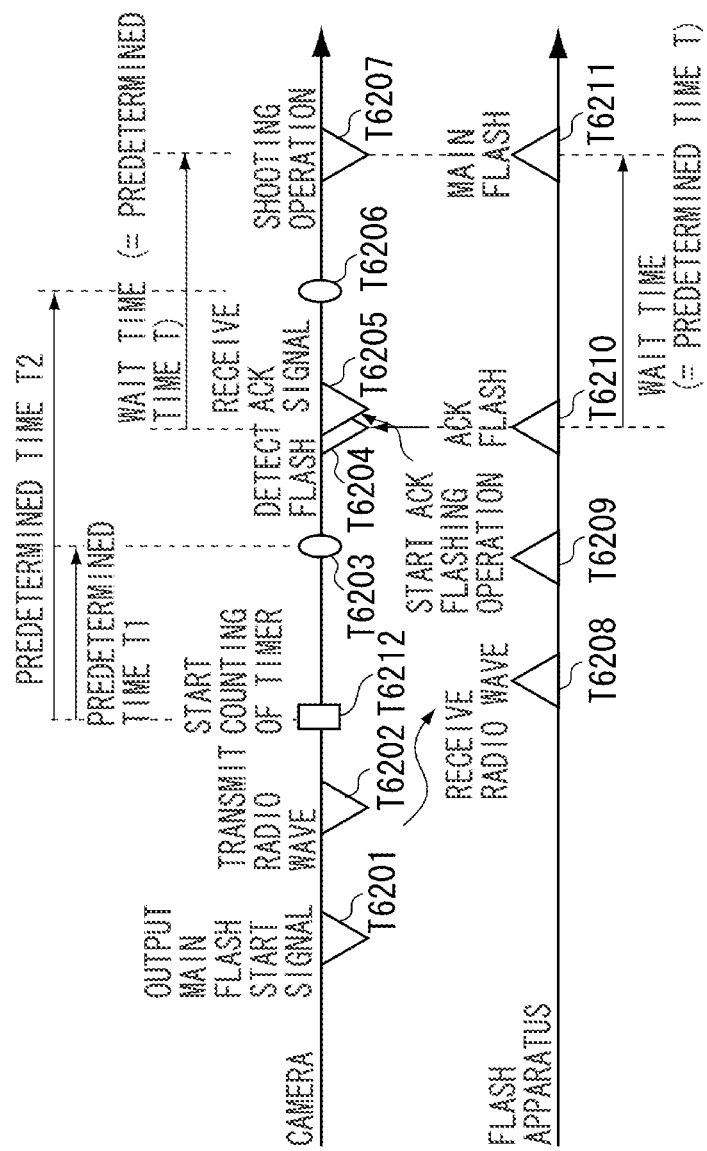

US 8,768,158 B2

IMAGE PICKUP APPARATUS, FLASH APPARATUS, AND CAMERA SYSTEM

BACKGROUND OF THE INVENTION

1. Field of the Invention

The present invention relates to an image pickup apparatus, a flash apparatus, and a camera system including the image pickup apparatus and the flash apparatus configured to execute wireless communication by radio waves.

2. Description of the Related Art

In recent years, a camera system has been developed, which includes an image pickup apparatus and a flash apparatus configured to execute wireless communication by radio waves. In a conventional camera system of this type, the image pickup apparatus transmits a flash start command to the flash apparatus by radio waves and the flash apparatus starts flashing according to the received command.

However, in the above-described conventional camera system, a time delay may arise between the time at which the image pickup apparatus transmits a flash start command to the flash apparatus by radio waves and the time at which the flash apparatus starts flashing. Accordingly, it is difficult to match the timing of flashing by the flash apparatus, which is connected to the image pickup apparatus by wireless communication, with the time of shooting by the image pickup apparatus.

SUMMARY OF THE INVENTION

According to an aspect of the present invention, an image pickup apparatus configured to execute wireless communication with a flash apparatus by radio waves via a communication unit includes a signal output unit configured to output a flash start signal to the flash apparatus, a flash detection unit configured to detect a flash emitted by the flash apparatus according to the flash start signal, an acquisition unit configured to acquire a time difference between a predetermined reference timing and a timing at which the flash is regarded to have been emitted by the flash apparatus according to a result of detection by the flash detection unit, and a control unit configured to control at least one of a timing of output of the flash start signal to the flash apparatus by the signal output unit and a timing of start of an operation executed corresponding to the flash by the flash apparatus according to the time difference acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 22 is a timing chart illustrating exemplary timings of operations executed by the camera and a flash apparatus during shooting according to the sixth exemplary embodiment of the present invention.

DESCRIPTION OF THE EMBODIMENTS

Various exemplary embodiments, features, and aspects of the invention will be described in detail below with reference to the drawings.

Figure 1:
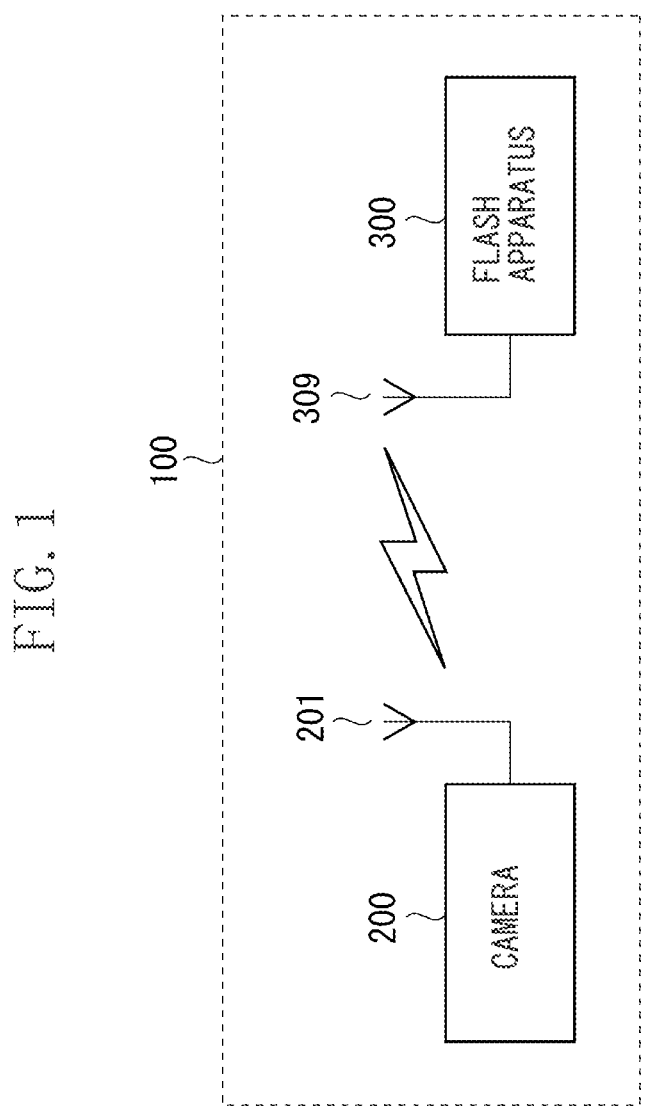
FIG. 1 illustrates an exemplary configuration of a camera system configured to execute wireless communication by radio waves.

FIG. 1 illustrates an exemplary configuration of a camera system including an image pickup apparatus and a flash apparatus according to a first exemplary embodiment of the present invention, which is configured to execute wireless communication by radio waves. Referring to FIG. 1, a camera system 100 includes a camera 200, which is an image pickup apparatus, and a flash apparatus 300, which is a flashlight emission apparatus. The camera 200 and the flash apparatus 300 are in communication with each other via wireless communication by radio waves, such as a wireless local area network (LAN) or Bluetooth®, via antennas 201 and 309 built-in in or connected to the camera 200 and the flash apparatus 300.

When shooting including flashing by the flash apparatus 300 (hereinafter simply referred to as "flash shooting") is executed in the camera system 100, at first, the amount of main flashing by the flash apparatus 300 is determined and the flash apparatus 300 executes pre-flashing immediately before shooting. More specifically, the camera 200 detects the brightness of an object at the time of the pre-flashing by using a light metering unit. Then, the camera 200 transmits information, such as an appropriate flash amount for shooting, to the flash apparatus by wireless communication. In the following description, in the camera system 100, the camera 200 is used as a master apparatus and the flash apparatus is used as a slave apparatus.

Figure 2:
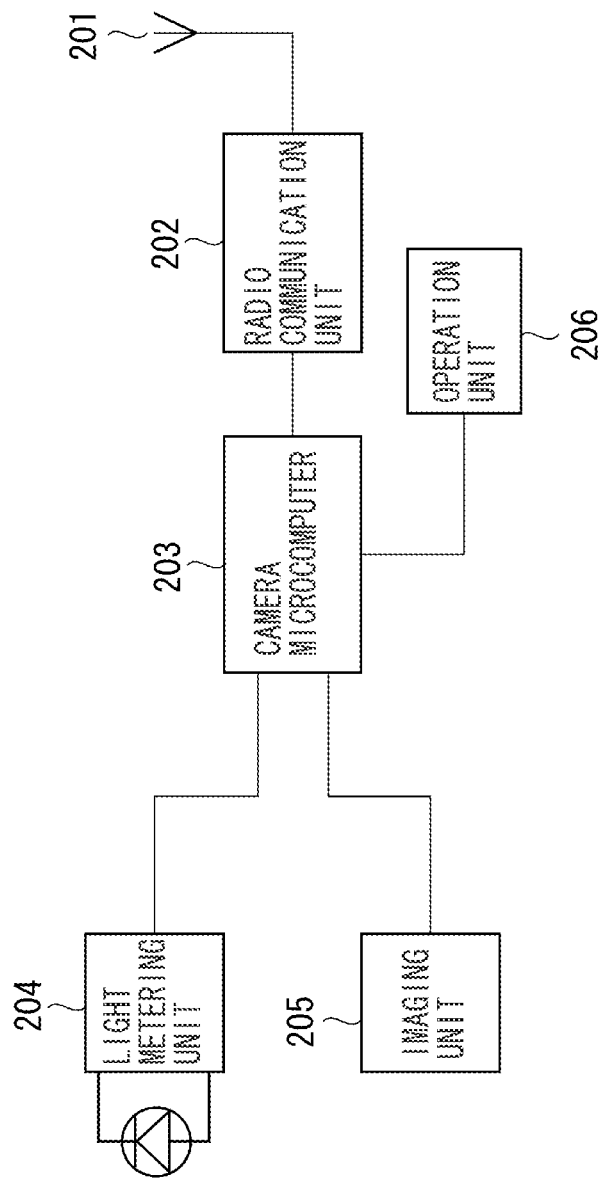
FIG. 2 is a block diagram illustrating an exemplary partial configuration of a camera, which is a master apparatus according to an exemplary embodiment of the present invention.

FIG. 2 is a block diagram illustrating an exemplary partial configuration of the camera 200, which is the master apparatus according to the present exemplary embodiment. An exemplary configuration of the camera 200 will be described in detail below with reference to FIG. 2.

Referring to FIG. 2, the camera 200 includes a wireless communication antenna 201, a radio communication unit 202, which controls radio communication, and a microcomputer (hereinafter simply referred to as a "camera microcomputer") 203, which controls an operation of components of the camera 200.

A light metering unit 204 includes a light metering sensor and measures the luminance of an object by photometry. An imaging unit 205, which includes an image sensor, photographs an image of an object. The operation unit 206 includes a power switch for toggling power supply to the camera 200 on and off and a release switch for inputting an instruction for starting a shooting preparation operation or a shooting operation.

Now, a shooting sequence executed when the flash shooting is executed by the camera 200 including the above-described configuration will be described in detail below with reference to FIG. 4.

When a camera power switch included in the operation unit 206 is pressed by a user of the camera 200, a camera microcomputer 203 starts its operation. More specifically, the camera microcomputer 203 prepares for control of components, such as a radio communication unit 202, a light metering unit 204, and an imaging unit 205. Then the processing illustrated in FIG. 4 starts.

Figure 4:
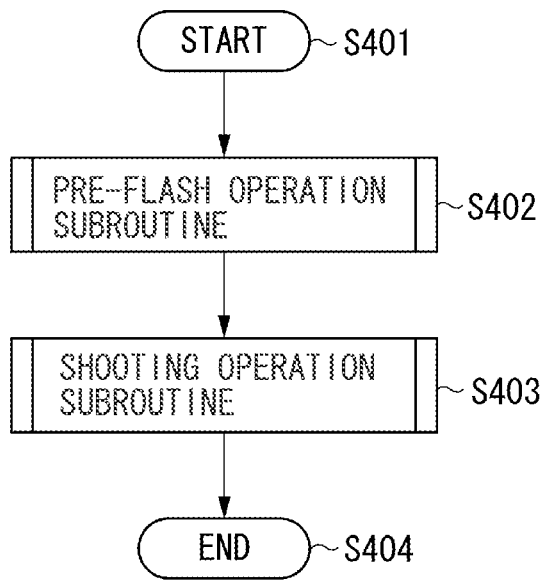
FIG. 4 is a flow chart illustrating an exemplary shooting sequence executed by the camera according to the first exemplary embodiment, which is executed during flash shooting.

Referring to FIG. 4, in step S401, when the user presses the release switch of the operation unit 206 and inputs an instruction for starting a shooting operation, the camera microcomputer 203 starts the following sub routine for executing the flash shooting.

In step S402, the camera 200 starts the sub routine for executing a pre-flashing operation for determining the amount of a main flash by the flash apparatus 300 executed during the flash shooting. In step S403, the camera 200 starts a sub routine for executing a shooting operation for shooting with a main flash by the flash apparatus 300 by the flash amount calculated and determined according to the pre-flashing operation in step S402. In step S404, the shooting sequence ends.

Figure 3:
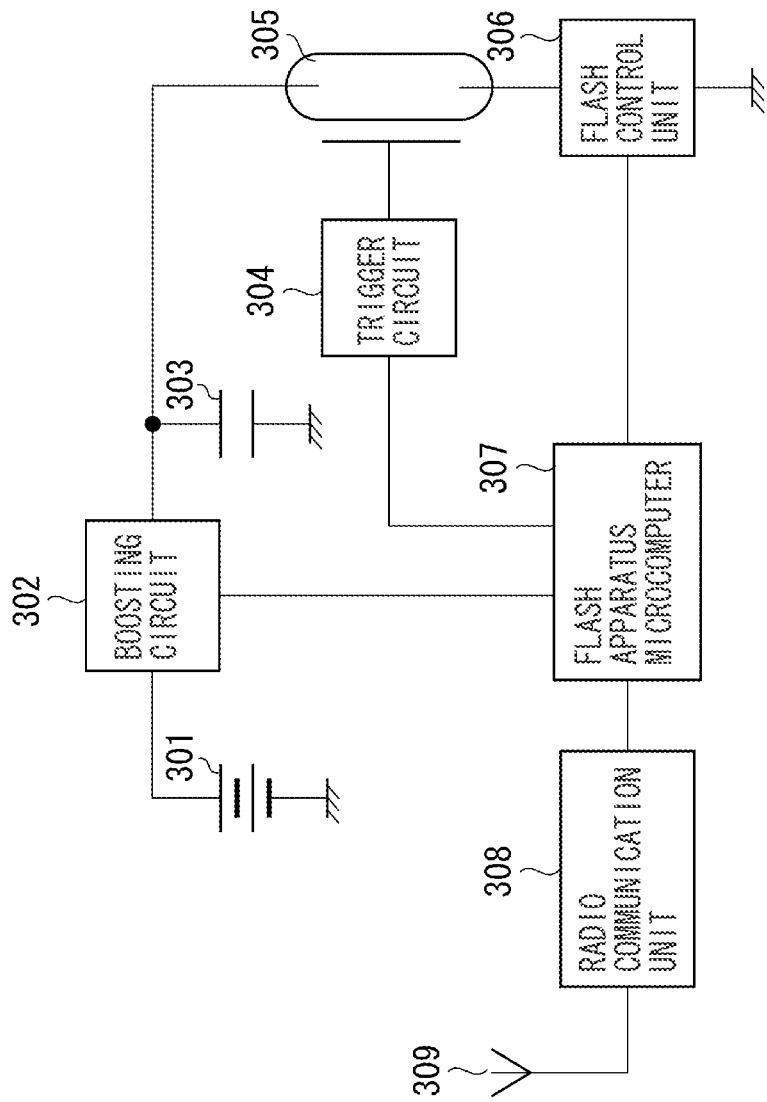
FIG. 3 is a block diagram illustrating an exemplary partial configuration of a flash apparatus, which is a slave apparatus according to an exemplary embodiment of the present invention.

FIG. 3 is a block diagram illustrating an exemplary partial configuration of the flash apparatus 300, which is the slave apparatus. An exemplary configuration of the flash apparatus 300 will be described in detail below with reference to FIG. 3.

Referring to FIG. 3, the flash apparatus 300 includes a battery 301, a boosting circuit 302, and a main condenser 303. The battery 301 is the power source of the flash apparatus 300. The boosting circuit 302 boosts the voltage of the battery 301 by several hundred volts. The main condenser 303 stores (charges) electric energy boosted up by the boosting circuit 302.

An existing trigger circuit 304 applies a voltage as high as several kilovolts to an electric discharge tube 305 to excite the electric discharge tube 305. The electric discharge tube 305 converts the electric energy stored by the main condenser 303 into light energy.

A flash control unit 306 controls flashing by the electric discharge tube 305. A microcomputer (hereinafter simply referred to as a "flash apparatus microcomputer") 307 controls an operation of components of the flash apparatus 300. In addition, the flash apparatus 300 includes the wireless communication antenna 309. A radio communication unit 308 controls radio communication with a camera or other flash apparatuses connected to the flash apparatus 300.

When a power switch (not illustrated) of the flash apparatus 300 having the above-described configuration is pressed, the flash apparatus microcomputer 307 starts operating and causes the boosting circuit 302 to start a boosting operation. The electric energy boosted up by the boosting circuit 302 is stored on the main condenser 303. The storage of the electric energy on the main condenser 303 continues until the voltage of the electric discharge tube 305 reaches a charging voltage level at which flashing becomes available. When the radio communication unit 308 receives a flash start signal from the camera 200, the electric discharge tube 305 flashes by using the electric energy stored on the main condenser 303.

Delay time arises during wireless communication by radio waves. An operation for measuring the delay time by utilizing pre-flashing will be described in detail below with reference to a flow chart of FIG. 5 and a timing chart of FIG. 8. In the example illustrated in FIG. 8, an upper horizontal axis indicates a time axis for the camera 200 and a lower horizontal axis indicates a time axis for the flash apparatus 300.

Figure 5:
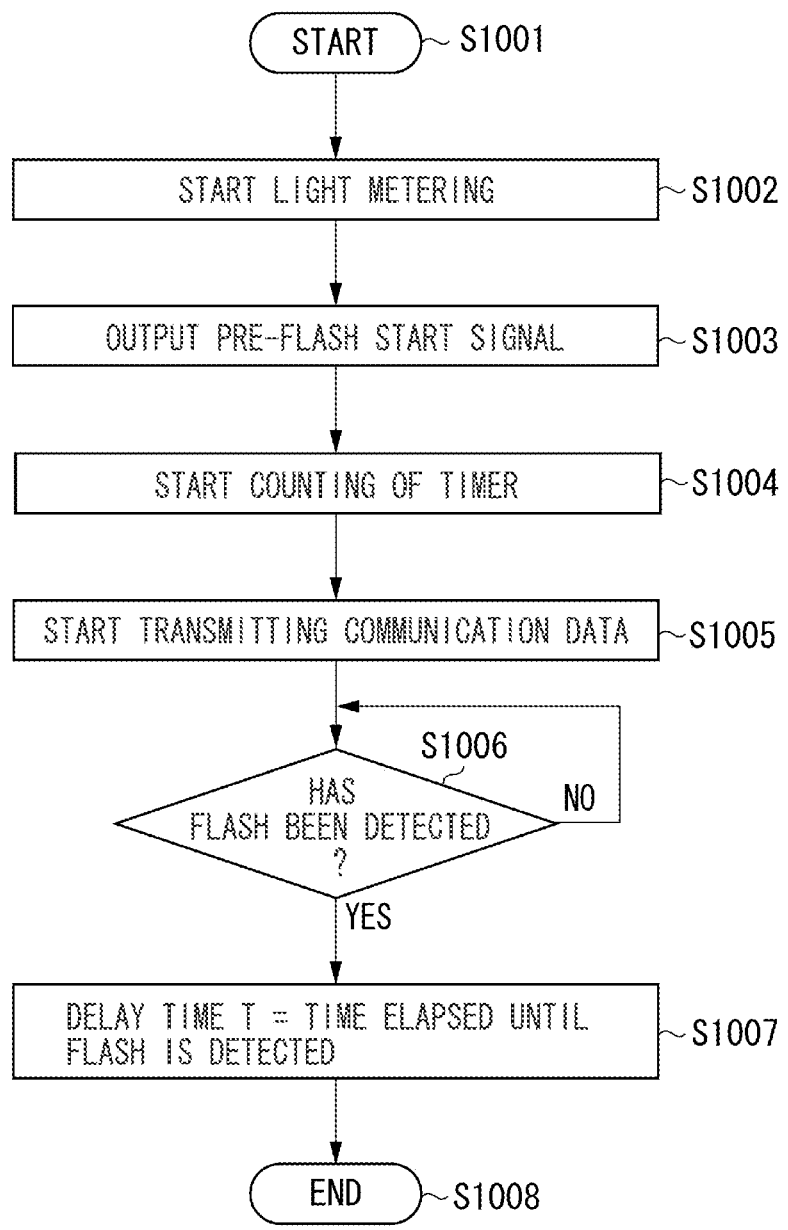
FIG. 5 is a flow chart illustrating an exemplary flow of a delay time measurement operation, which is executed by the camera according to the first exemplary embodiment of the present invention.

Referring to FIG. 5, when the user inputs an instruction for starting a shooting operation by pressing the release switch of the operation unit 206, the processing illustrated in FIG. 5 starts from step S1101. In step S1101, the camera 200 starts a sub routine of the pre-flash operation executed in step S402 (FIG. 4).

In step S1002, the camera microcomputer 203 starts a light-metering operation with the light metering unit 204. Then the processing advances to step S1003. In step S1003, the camera microcomputer 203 outputs a pre-flash start signal to the radio communication unit 202. Then the processing advances to step S1004. A timing T1301 illustrated in FIG. 8 corresponds to the timing of output of the pre-flash start signal.

In step S1004, the camera microcomputer 203 uses a built-in timer to measure the time taken for receiving a flash detection signal, which indicates that the light metering unit 204 has detected a flash. The time counting operation by the timer starts at the timing T1301. If it is detected by the light metering unit 204 that the variation of luminance equal to or more than a predetermined value has occurred within predetermined period of time, then the light metering unit 204 outputs a flash detection signal to the camera microcomputer 203.

In step S1005, the radio communication unit 202 modulates the pre-flash start signal output by the camera microcomputer 203 into communication data and starts transmitting the communication data via the wireless communication antenna 201. A timing T1302 illustrated in FIG. 8 corresponds to the timing of starting the transmission of the communication data.

After transmitting the pre-flash start signal via the radio communication unit 202, in step S1006, the camera microcomputer 203 determines whether a flash detection signal input by the light metering unit 204 has been detected. If a flash detection signal input by the light metering unit 204 has been detected (Yes in step S1006), then the processing advances to step S1007. A timing T1303 illustrated in FIG. 8 corresponds to the timing of detection of the flash detection signal input by the light metering unit 204.

In step S1007, the camera microcomputer 203 acquires a value of the currently operating timer when the flash detection signal is detected (i.e., time elapsed since the timing of output of the pre-flash start signal to the timing of detection of the flash detection signal). In addition, the camera microcomputer 203 stores the acquired value on a storage unit (not illustrated) as delay time T. Then the processing advances to step S1008. In step S1008, the sub routine of the pre-flash operation ends. Then, the processing advances to step S403 (FIG. 4), which is processing immediately subsequent to the shooting sequence.

As described above, the camera microcomputer 203 measures the time from the timing of output of the pre-flash start signal to the timing of detection by the light metering unit 204 of the pre-flash emitted by the flash apparatus 300. Accordingly, the present exemplary embodiment can accurately measure the delay time from the timing of input of the flash start instruction to the flash start timing. This is because the timing of actual pre-flash can be considered to match the pre-flash detection timing because the time taken from the timing of pre-flash of the flash apparatus 300 to the timing of detection of the flash by the light metering unit 204 includes substantially no delay.

In the following description, due to the above-described reasons, it is supposed that the timing considered as a flash timing based on a result of the detection is the timing of actual flash. Alternatively, the timing considered to be the flash timing can be determined based on a time difference between the timing of actual flash and the timing of detection of the flash.

In addition, because the time difference between the timing of pre-flash and the timing of main flash is small, the delay time at the time of pre-flash can be considered the same as the delay time at the time of main flash. Accordingly, a highly accurate delay time at the time of main flash can be acquired based on a result of measurement of the delay time at the time of pre-flash.

In the present exemplary embodiment, in order to measure the delay time, the built-in timer of the camera microcomputer 203 and the flash detection signal input by the light metering unit 204 are used. However, the present invention is not limited to this. More specifically, the following method can be used instead.

After transmitting the pre-flash start signal via the radio communication unit 202 in step S1005, serial shooting (continuous shooting) is executed at a predetermined speed by using the image sensor of the imaging unit 205. In addition, the camera microcomputer 203 selects an image on which a pre-flash has been performed by the flash apparatus 300, from among a plurality of photographed images.

In addition, the camera microcomputer 203 acquires information about an ordinal position of the selected image. Then, the time from the timing of outputting the pre-flash start signal by the camera microcomputer 203 in step S1003 to the timing of pre-flash by the flash apparatus 300 is calculated. If a light metering sensor of the light metering unit 204 can read images at a high speed, the light metering sensor of the light metering unit 204 can be used instead of the image sensor of the imaging unit 205. In reading images at a high speed, it is useful if it can be determined whether pre-flash has been executed. Accordingly, in executing high-speed signal reading, the speed of reading images can be improved by reading fewer signals than those read in normal reading processing by thinning out the signals to be read.

Now, processing executed by the flash apparatus microcomputer 307 when a flash start signal is received via the antenna 309 and the radio communication unit 308 of the flash apparatus 300 will be described in detail below with reference to a flow chart of FIG. 6 and a timing chart of FIG. 8.

When the communication data generated by modulating the flash start signal for starting pre-flash or main flash, which is input by the camera 200, is received via the antenna 309, the radio communication unit 308 of the flash apparatus 300 demodulates the received communication data and transmits the flash start signal to the flash apparatus microcomputer 307. A timing T1304 illustrated in FIG. 8 corresponds to the timing of reception of the communication data from the camera 200.

Figure 6:
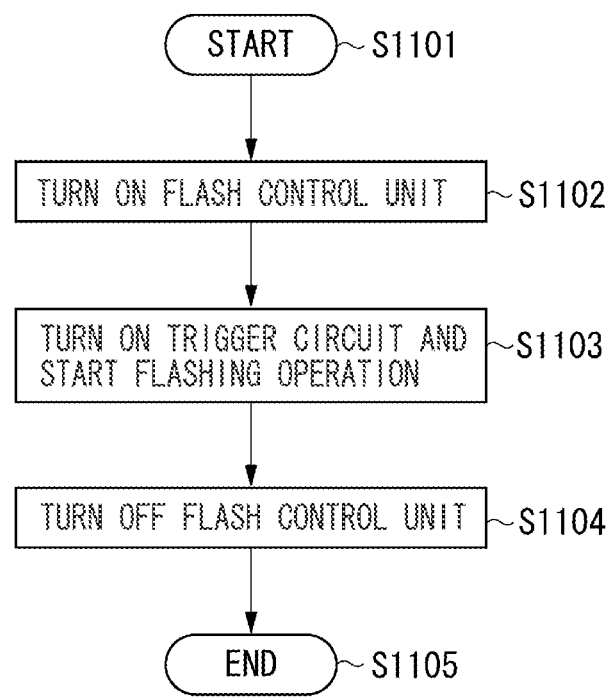
FIG. 6 is a flow chart illustrating an exemplary flashing sequence executed by the flash apparatus according to the first exemplary embodiment of the present invention.

After receiving the flash start signal from the radio communication unit 308, in step S1101 illustrated in FIG. 6, the flash apparatus microcomputer 307 starts a sub routine for executing pre-flash or main flash according to the received flash start signal. In step S1102, the flash apparatus microcomputer 307 outputs an H signal to the flash control unit 306. Accordingly, the flash control unit 306 is turned on. In this manner, a discharge loop including an anode of the main condenser 303, the electric discharge tube 305, the flash control unit 306, and a cathode of the main condenser 303 is formed.

In step S1103, the flash apparatus microcomputer 307 outputs an H signal to the trigger circuit 304 for a predetermined time period. Accordingly, the trigger circuit 304 applies a high voltage to the electric discharge tube 305. Then, the electric discharge tube 305 starts flashing. A timing T1305 illustrated in FIG. 8 corresponds to the timing of start of the flashing.

In step S1104, the flash apparatus microcomputer 307 outputs an L signal to the flash control unit 306. Accordingly, the flash control unit 306 is turned off. In this manner, the discharge loop including the anode of the main condenser 303, the electric discharge tube 305, the flash control unit 306, and the cathode of the main condenser 303 is disconnected. Then the electric discharge tube 305 stops the flashing. In step S1105, the flashing operation ends.

Figure 7:
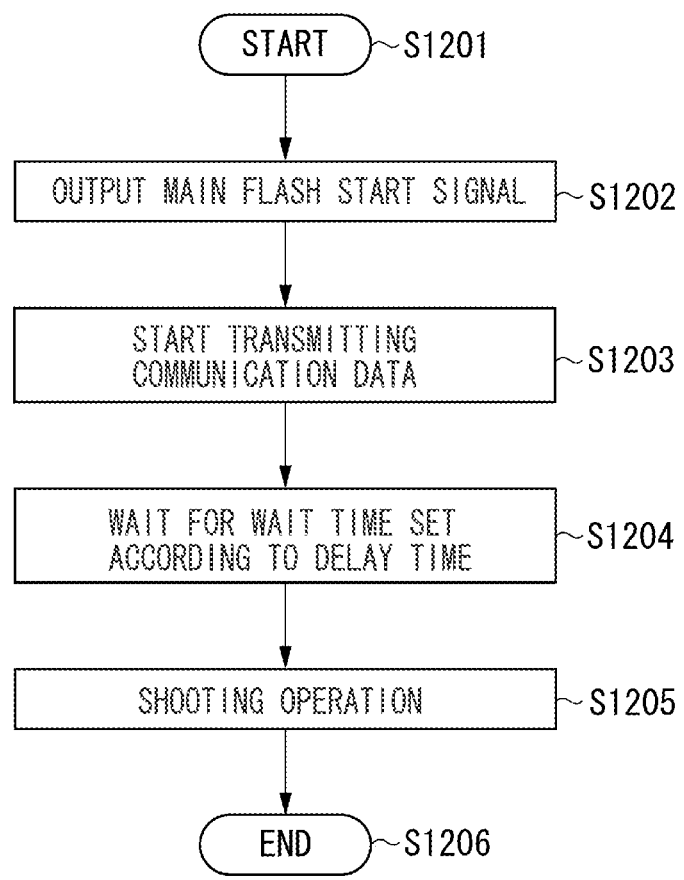
FIG. 7 is a flow chart illustrating an exemplary flow of a shooting operation executed by the camera according to the first exemplary embodiment of the present invention.
Figure 9:
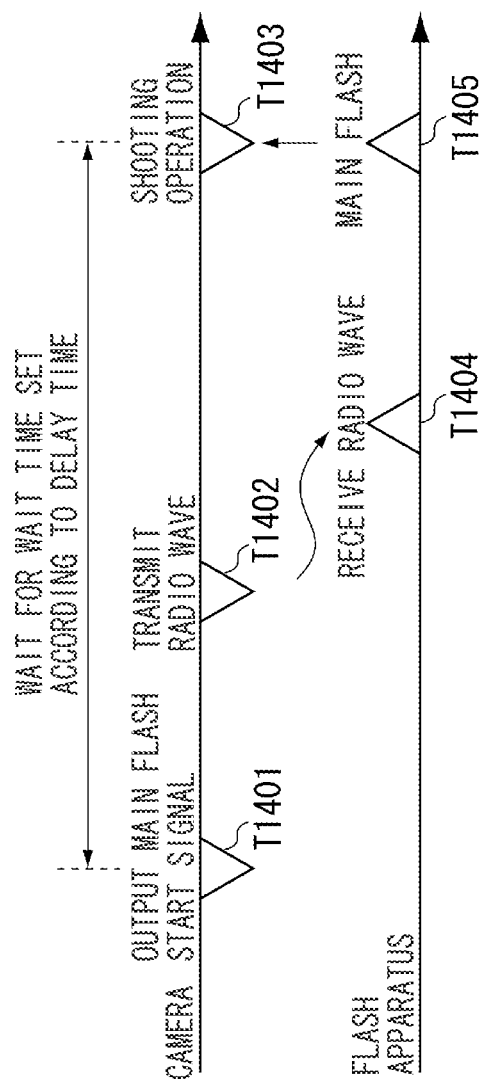
FIG. 9 is a timing chart illustrating exemplary timings of operations executed by the camera and the flash apparatus during main shooting according to the first exemplary embodiment of the present invention.

Now, a shooting operation that uses the delay time measured during pre-flash will be described in detail below with reference to a flow chart of FIG. 7 and a timing chart of FIG. 9. In the example illustrated in FIG. 9, an upper horizontal axis indicates a time axis for the camera 200 and a lower horizontal axis indicates a time axis for the flash apparatus 300.

Figure 8:
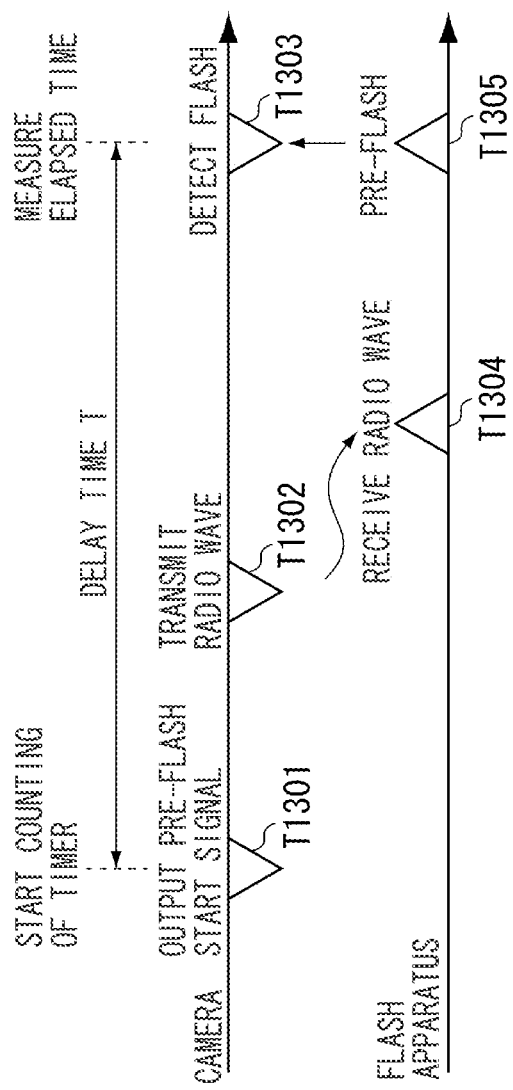
FIG. 8 is a timing chart illustrating exemplary timings of operations executed by the camera and the flash apparatus during delay time measurement processing according to the first exemplary embodiment of the present invention.

After the subroutine for the pre-flash operation ends, then in step S1201 illustrated in FIG. 8, the sub routine of the shooting operation by the main flash starts. In step S120, the camera microcomputer 203 outputs a main flash start signal to the radio communication unit 202. Then the processing advances to step S1203. A timing T1401 illustrated in FIG. 9 corresponds to the timing of output of the main flash start signal.

In step S1203, the radio communication unit 202 modulates the main flash start signal output by the camera microcomputer 203 into communication data and starts transmitting the communication data via the wireless communication antenna 201. A timing T1402 illustrated in FIG. 9 corresponds to the timing of starting the transmission of the communication data.

In step S1204, the camera microcomputer 203 executes waiting processing according to the delay time measured and stored during the pre-flash. The waiting processing in step S1204 is executed to synchronize a main exposure performed in the following manner with the main flash emitted by the flash apparatus 300. More specifically, the camera microcomputer 203 sets wait time based on the delay time measured during the pre-flash in order to execute the main flash during the main exposure by the camera 200.

In the present exemplary embodiment, time equivalent to the measured delay time is set as the wait time. However the wait time can be set not only according to the measured delay time but also according to a setting of a timing of flash. In other words, if leading blade-synchronized shooting, in which the main flash is executed immediately after the start of the exposure, is executed, and supposing that the delay time equivalent to the delay time measured at the time of the pre-flash arises at the time of the main flash, then time equivalent to the delay time measured at the time of the pre-flash can be set as the wait time for waiting for the start of the main flash.

Furthermore, if trailing blade-synchronized shooting, in which the main flash is executed immediately before the start of the exposure, is executed, and supposing that the delay time equivalent to the delay time measured at the time of the pre-flash arises at the time of the main flash, then the wait time can be set according to the delay time measured at the time of the pre-flash and the set exposure time.

In the present exemplary embodiment, the "start of the exposure" refers to a timing at which the entire imaging region of the image sensor starts the exposure with a shutter (not illustrated) which travels. Furthermore, the "end of the exposure" refers to a timing at which at least a part of the imaging region of the image sensor ends the exposure with the shutter (not illustrated) which travels.

After the waiting processing ends, the processing advances to step S1205. In step S1205, the camera microcomputer 203 controls the imaging unit 205 to execute the main exposure (main shooting). A timing T1403 illustrated in FIG. 9 corresponds to the timing of executing the processing in step S1205. In step S1206, the sub routine of the shooting operation ends. Then, the processing returns to the routine of the shooting sequence.

On the other hand, after receiving the communication data generated by modulating the main flash start signal input by the camera 200 via the antenna 309, the flash apparatus 300 demodulates the communication data received by the radio communication unit 308 and transmits the main flash start signal to the flash apparatus microcomputer 307. A timing T1404 illustrated in FIG. 9 corresponds to the timing of reception of the communication data from the camera 200.

After receiving the main flash start signal from the radio communication unit 308, the flash apparatus microcomputer 307 executes control for starting the main flash of the electric discharge tube 305 according to the received main flash start signal. A timing T1405 illustrated in FIG. 9 corresponds to the flash start timing.

As described above, the present exemplary embodiment calculates the accurate delay time from the timing of inputting the flashing instruction to the flash start timing during the pre-flash. In addition, the present exemplary embodiment waits before executing the main flash for the calculated accurate delay time. With the above-described configuration, the present exemplary embodiment can synchronize the timing of the main flash emitted by the flash apparatus 300 with the timing of the main exposure performed by the camera 200 as desired by the photographer (user).

Now, a second exemplary embodiment of the present invention will be described in detail below. Configurations of the camera 200 and the flash apparatus 300 according to the present exemplary embodiment are the same as those of the first exemplary embodiment illustrated in FIGS. 2 and 3. Accordingly, the detailed description thereof will not be repeated here.

More specifically, the present exemplary embodiment is different from the first exemplary embodiment with respect to the operation for measuring the delay time. In other words, in the present exemplary embodiment, if a flash detection signal is output by the light metering unit 204 within a predetermined time period from the timing of output of the flash start signal, then it is determined that a pre-flash has been detected.

With the above-described configuration, the present exemplary embodiment can suppress or prevent wrongly detecting light emitted from a light source different from the intended flash apparatus, and determining that the pre-flash has been executed based on the erroneously detected light. In addition, even if a flash start signal has been transmitted due to an error, such as a communication error, the present exemplary embodiment having the above-described configuration can detect that the flash apparatus 300 cannot currently execute flashing.

An operation for measuring the delay time according to the present exemplary embodiment will be described in detail below with reference to a flow chart of FIG. 10 and a timing chart of FIG. 11. In the example illustrated in FIG. 11, an upper horizontal axis indicates a time axis for the camera 200 and a lower horizontal axis indicates a time axis for the flash apparatus 300.

Figure 10:
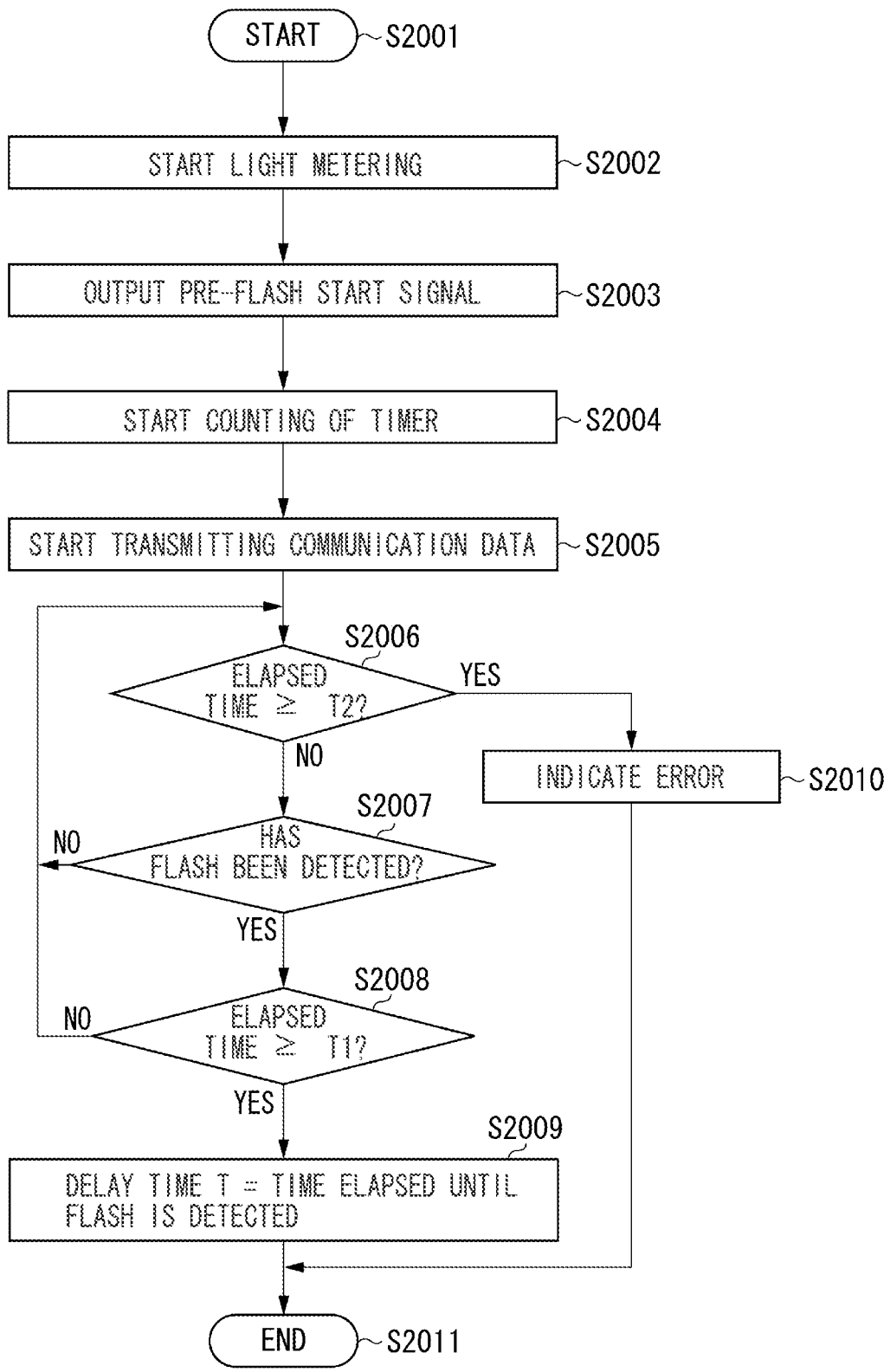
FIG. 10 is a flow chart illustrating an exemplary flow of a delay time measurement operation by a camera according to the second exemplary embodiment of the present invention.

In addition, processing in steps S2001 through S2005 illustrated in FIG. 10 is similar to the processing in steps S1001 through S1005 described above with reference to FIG. 5 in the first exemplary embodiment, respectively. Accordingly, in the following description, the detailed description thereof will not be repeated here.

Referring to FIG. 10, in step S2006, the camera microcomputer 203 determines whether a predetermined time T2 has elapsed since outputting of the pre-flash start signal. If it is determined that the predetermined time T2 has not elapsed since the outputting of the pre-flash start signal (No in step S2006), then the processing advances to step S2007. On the other hand, if it is determined that the predetermined time T2 has elapsed since of the outputting of the pre-flash start signal (Yes in step S2006), then the processing advances to step S2010.

In step S2010, the camera microcomputer 203 executes error indication processing for indicating that the light metering unit 204 has not detected any pre-flash emitted by the flash apparatus 300. Then the sub routine of the pre-flash operation ends. If no flash detection signal has been output by the light metering unit 204 even after the predetermined time T2 has elapsed, it can be determined that the flash apparatus 300 cannot execute flashing due to an error, such as a communication error even if a flash start signal is input to the flash apparatus 300.

More specifically, in step S2010, an error flag can be set to indicate that an error has occurred. Alternatively, error information can be notified to a control integrated circuit (IC) (not illustrated) different from the camera microcomputer 203. Further alternatively, the processing can return to step S2002 or S2003. Yet further alternatively, a notification unit (not illustrated) can notify the user that an error has occurred.

After transmitting the pre-flash start signal via the radio communication unit 202, in step S2007, the camera microcomputer 203 determines whether a flash detection signal input by the light metering unit 204 has been detected. If a flash detection signal input by the light metering unit 204 has been detected (Yes in step S2007), then the processing advances to step S2008. On the other hand, if no flash detection signal input by the light metering unit 204 has been detected yet (No in step S2007), then the processing returns to step S2006.

In step S2008, the camera microcomputer 203 determines whether a predetermined time T1 has elapsed before a flash detection signal is detected after outputting of the pre-flash start signal. If it is determined that the predetermined time T1 has elapsed before a flash detection signal is detected after the outputting of the pre-flash start signal (Yes in step S2008), then the processing advances to step S2009. On the other hand, if it is determined that the predetermined time T1 has not elapsed before a flash detection signal is detected after the outputting of the pre-flash start signal (No in step S2008), then the processing returns to step S2006, based on a determination that the light metering unit 204 has made a wrong detection.

As described above, if the light metering unit 204 has detected a flash emitted by the flash apparatus 300 before the predetermined pre-flash start time, the present exemplary embodiment determines that the light metering unit 204 has wrongly detected light from a different light source as the flash emitted by the flash apparatus 300. In this case, the present exemplary embodiment waits until a pre-flash is executed again. With the above-described configuration, the present exemplary embodiment can accurately measure the delay time.

Figure 11:
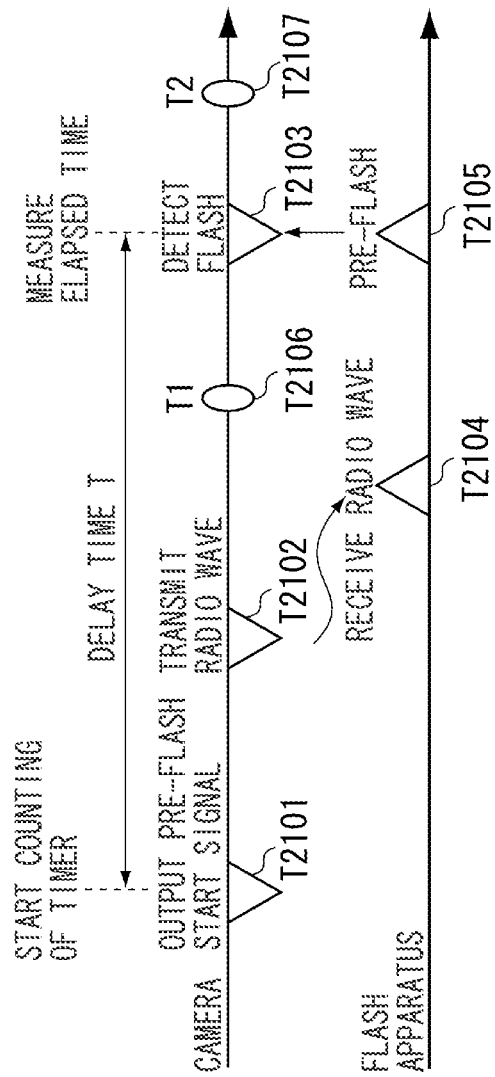
FIG. 11 is a timing chart illustrating exemplary timings of operations executed by the camera and a flash apparatus during delay time measurement processing according to the second exemplary embodiment of the present invention.

The predetermined time T1 (a first predetermined time) and a predetermined time T2 (a second predetermined time) have a relationship "T1<T2" as illustrated in FIG. 11.

In step S2009, the camera microcomputer 203 stores the value of the operating timer acquired at the timing of detection of the flash detection signal, i.e., the elapsed time from outputting of the pre-flash start signal until detection of the flash detection signal stored as the delay time T. Then the processing advances to step S2011. In step S2011, the sub routine of the pre-flash operation ends.

In the processing executed by the flash apparatus microcomputer 307 when a flash start signal is received via the antenna 309 and the radio communication unit 308 of the flash apparatus 300, the present exemplary embodiment executes the same processing as that executed by the first exemplary embodiment described above. Accordingly, the detailed description thereof will not be repeated here.

As described above, if the flash detection signal is output by the light metering unit 204 within the predetermined time period, the present exemplary embodiment determines that a pre-flash has been detected by the light metering unit 204. Accordingly, the present exemplary embodiment can prevent the light metering unit 204 from wrongly detecting light from a light source different from the intended flash apparatus 300 and determining that a pre-flash has been executed. Therefore, the present exemplary embodiment can measure the delay time with a high accuracy. Accordingly, the present exemplary embodiment having the above-described configuration can accurately synchronize the timing of the main flash by the flash apparatus 300 with the timing of the main exposure by the image pickup apparatus (camera) 200.

If no pre-flash has been detected within the predetermined time period from the reference timing of output of the pre-flash start signal, the present exemplary embodiment can determine that the flash apparatus 300 cannot execute flashing due to an error such as a communication error even if a flash start signal is input to the flash apparatus 300.

For the method for acquiring the delay time, a different method can be used as in the first exemplary embodiment. More specifically, the delay time can be measured according to the ordinal position of an image, among images serially photographed at a high speed, on which a pre-flash has been performed. In this case, images taken before the predetermined time T1 may not be used as the basis of selecting the image used for identifying a pre-flash. Alternatively, the continuous shooting can be started after the time T1 elapses.

In addition, because a time period in which a pre-flash is likely to start is set as the predetermined time T1 and the predetermined time T2, the predetermined time T1 and the predetermined time T2 may be changed according to a communication method and a communication rate.

Now, a third exemplary embodiment of the present invention will be described in detail below. Configurations of the camera 200 and the flash apparatus 300 according to the present exemplary embodiment are the same as those of the first exemplary embodiment illustrated in FIGS. 2 and 3. Accordingly, the detailed description thereof will not be repeated here.

More specifically, the present exemplary embodiment is different from the first exemplary embodiment with respect to the operation for measuring the delay time. In other words, in the present exemplary embodiment, when the flash apparatus 300 executes pre-flashing, a pre-flash identification signal, which indicates that the flash apparatus 300 has executed pre-flashing, is transmitted to the camera 200. In addition, if the camera microcomputer 203 receives a flash detection signal from the light metering unit 204 and a pre-flash identification signal from the flash apparatus 300, the present exemplary embodiment determines that the flash apparatus 300 has executed the pre-flashing.

With the above-described configuration, the present exemplary embodiment can identify a pre-flash emitted by the intended flash apparatus 300 from among a plurality of flashes detected by the light metering unit 204 with a high accuracy. Accordingly, the present exemplary embodiment can suppress or prevent a wrong detection of light emitted by a light source different from the intended flash apparatus 300.

In addition, the present exemplary embodiment transmits a pre-flash identification signal from the flash apparatus 300 to the camera 200. Accordingly, the present exemplary embodiment can verify that the communication between the camera 200 and the flash apparatus 300 has been normally executed.

Figure 12:
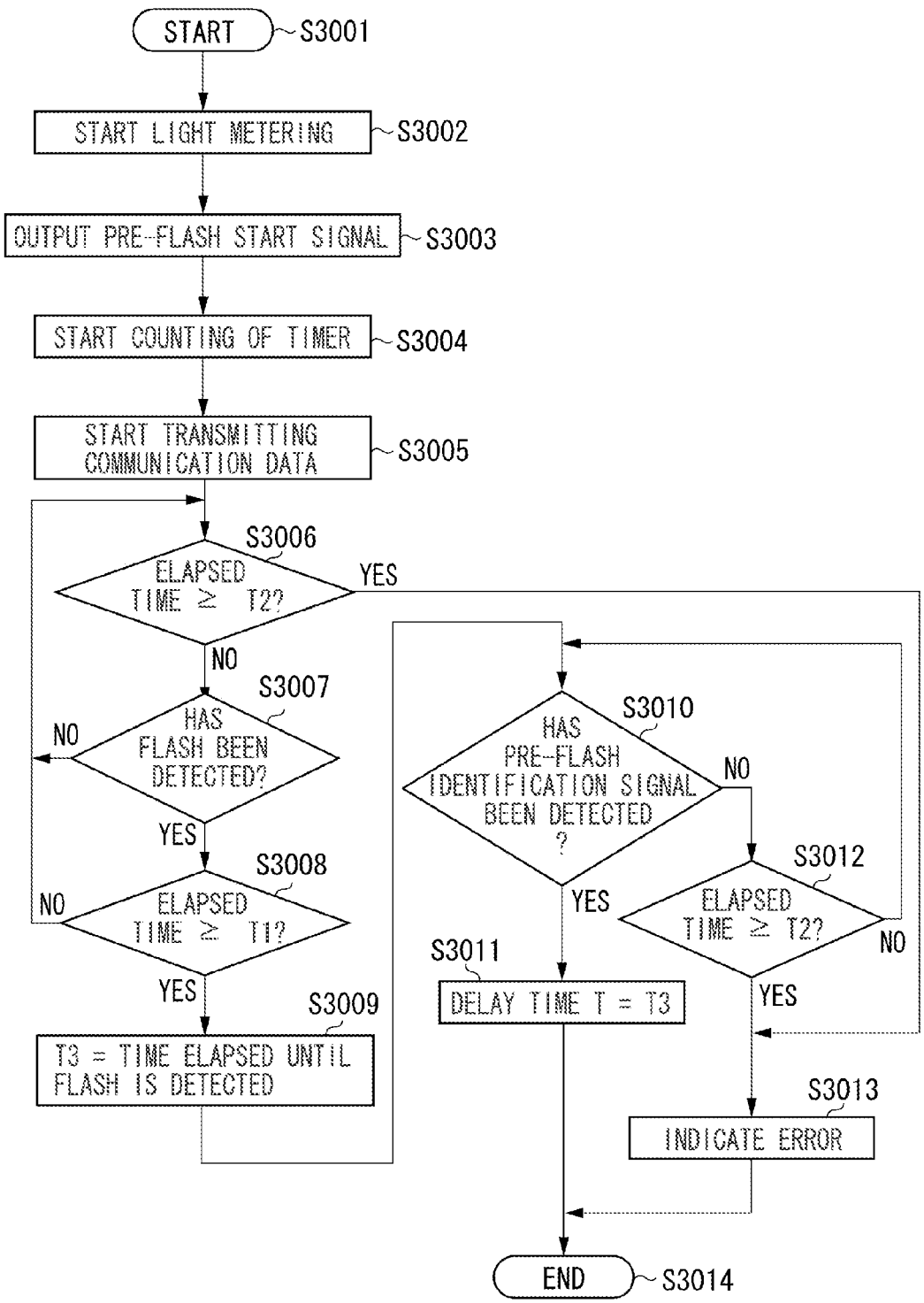
FIG. 12 is a flow chart illustrating an exemplary flow of a delay time measurement operation by a camera according to a third exemplary embodiment of the present invention.
Figure 14:
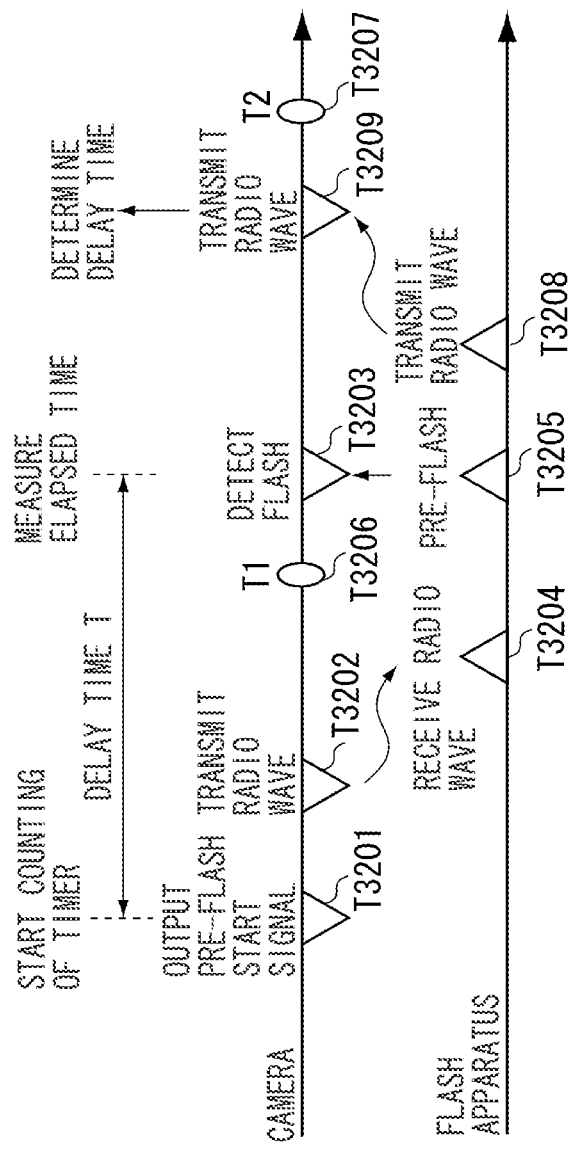
FIG. 14 is a timing chart illustrating exemplary timings of operations executed by the camera and the flash apparatus during delay time measurement processing according to the third exemplary embodiment of the present invention.

Now, an operation for measuring the delay time according to the present exemplary embodiment will be described in detail below with reference to a flow chart of FIG. 12 and a timing chart of FIG. 14. In the example illustrated in FIG. 14, an upper horizontal axis indicates a time base for the camera 200 and a lower horizontal axis indicates a time axis for the flash apparatus 300. In addition, processing in steps S3001 through S3008 illustrated in FIG. 12 is similar to the processing in steps S2001 through S2008 described above with reference to FIG. 10 in the first exemplary embodiment, respectively. Accordingly, in the following description, the detailed description thereof will not be repeated.

Referring to FIG. 12, if it is determined that the predetermined time T1 has elapsed (Yes in step S3008), then the processing advances to step S3009. In step S3009, the camera microcomputer 203 stores the count value of the operating timer at the time of detection of the flash detection signal as a provisional delay time 13. Then the processing advances to step S3010.

In step S3010, the camera microcomputer 203 determines whether a pre-flash identification signal, which indicates that the flash apparatus 300 has executed a pre-flash, has been received from the flash apparatus 300. If it is determined that a pre-flash identification signal has been received (Yes in step S3010), then the processing advances to step S3011. On the other hand, if it is determined that no pre-flash identification signal has been received (No in step S3010), then the processing advances to step S3012.

In step S3011, the camera microcomputer 203 finally sets the provisional delay time T3, which has been stored in step S3009, as the delay time T. Then the processing advances to step S3015. In step S3015, the sub routine of the pre-flash operation ends.

If it is determined that no pre-flash identification signal has been received (No in step S3010), in step S3012, the camera microcomputer 203 outputs a pre-flash start signal. In addition, the camera microcomputer 203 determines whether the predetermined time T2 has elapsed. If it is determined that the predetermined time T2 has not elapsed yet (No in step S3012), then the processing returns to step S3010. On the other hand, if it is determined that the predetermined time T2 has elapsed (Yes in step S3012), then the processing advances to step S3013. In step S3013, the camera microcomputer 203 executes error indication processing.

Figure 13:
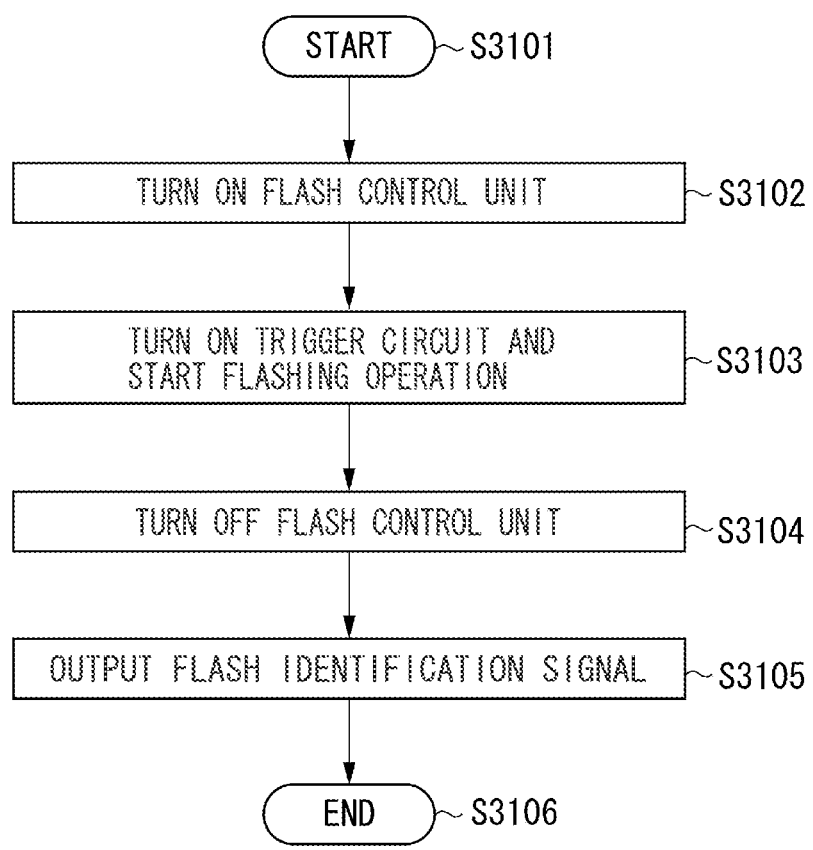
FIG. 13 is a flow chart illustrating an exemplary flashing sequence executed by a flash apparatus according to the third exemplary embodiment of the present invention.

Processing executed by the flash apparatus microcomputer 307 when a pre-flash start signal is received via the antenna 309 and the radio communication unit 308 of the flash apparatus 300 will be described in detail below with reference to a flow chart of FIG. 13. Processing in steps S3101 through S3104 illustrated in FIG. 13 is similar to the processing in steps S1101 through S1104 described above with reference to FIG. 6 in the first exemplary embodiment, respectively. Accordingly, in the following description, the detailed description thereof will not be repeated here.

After the flash control unit 306 is turned off in step S3104, the processing advances to step S3105. In step S3105, the camera microcomputer 203 transmits a pre-flash identification signal, which notifies the camera 200 that a pre-flash has been executed, to the camera 200 by using the antenna 309 via the radio communication unit 308. A timing T3208 illustrated in FIG. 14 corresponds to the pre-flash identification signal transmission timing. After transmitting the pre-flash identification signal, the processing advances to step S3106. In step S3106, the sub routine of the pre-flashing processing ends.

As described above, after the flash apparatus 300 has executed the pre-flashing, the present exemplary embodiment transmits the pre-flash identification signal to the camera 200. Accordingly, if the light metering unit 204 has detected a plurality of flashes, the present exemplary embodiment having the above-described configuration can accurately identify the desired pre-flash.

More specifically, if the flash detection signal and the flash identification signal have been received within the predetermined time period from outputting of the pre-flash start signal which is the reference timing (i.e., within the elapsed time equal to or longer than the predetermined time T1 and shorter than the predetermined time T2), it can be determined that a pre-flash from the intended flash apparatus 300 has been detected. Accordingly, the present exemplary embodiment can measure the delay time with a high accuracy. Therefore, the present exemplary embodiment can accurately synchronize the timing of the main exposure performed by the image pickup apparatus (camera) 200 with the timing of the main flash emitted by the flash apparatus 300.

In addition, in the present exemplary embodiment, the flash apparatus 300 transmits the pre-flash identification signal to the camera 200. Accordingly, the present exemplary embodiment can verify that the communication between the camera 200 and the flash apparatus 300 has been normally executed.

The delay time can be acquired by using another different method as shown in the first and the second exemplary embodiment. In addition, the following method can be employed. More specifically, the time period for the detection of a flash, which is executed by the light metering unit 204, is not restricted. In this case, if the flash identification signal is received within the predetermined time period from the detection of the flash, it can be determined that a pre-flash by the intended flash apparatus 300 has been detected.

In each of the above-described three (i.e., the first through the third) exemplary embodiments, the delay time used in wireless communication by radio waves is acquired based on a result of measuring the time from the outputting of the pre-flash start signal to the detection of a pre-flash. However, the method for acquiring the delay time is not limited to the above-described method based on the pre-flash detection timing.

More specifically, if modeling flashing is carried out, which is executed to previously verify a direction of irradiation of light from the flash apparatus 300 at the time of flash shooting, the delay time can be acquired at the timing of the flashing.

Each of the above-described first through the third exemplary embodiments can be modified as follows. More specifically, if the image pickup apparatus (camera) 200 can acquire the time period from the outputting of the flash start signal to the transmission of the communication data, which is generated by modulating the flash start signal, then the delay time can be calculated based on a result of measurement of the time elapsed after transmitting the communication data, instead of the time elapsed after outputting the flash start signal.

Each of the above-described first through the third exemplary embodiments is a mere example. The effect of each of the above-described first through the third exemplary embodiments can also be achieved by the following alternative configuration. More specifically, as the alternative configuration, a difference between the timing at which a flash by the flash apparatus 300 is regarded to have been executed and a predetermined reference timing is acquired. In addition, in this case, at least one of the timing of output of the flash start signal and the timing of start of the operation executed corresponding to a flash by the flash apparatus 300 can be controlled.

To paraphrase this, in each of the above-described first through the third exemplary embodiments, the camera microcomputer 203 delays the main exposure (shooting) performed by the image pickup apparatus (camera) 200. However, alternatively, the camera microcomputer 203 can control the timing of output of the flash start signal to synchronize the timing of the main exposure performed by the image pickup apparatus (camera) 200 with the timing of flashing by the flash apparatus 300. Further alternatively, the camera microcomputer 203 can control both the timing of the main exposure by the image pickup apparatus (camera) 200 and the timing of output of the flash start signal.

In each of the above-described first through the third exemplary embodiments, the timing of output of the flash start signal is set as the reference timing. Furthermore, the time difference between the reference timing and the timing of flashing by the flash apparatus 300 is set as the delay time. However, alternatively, a timing at which an arbitrarily set predetermined time has elapsed since the timing of output of the flash start signal can be set as the reference timing.

When the above-described configuration for controlling at least one of the timing of output of the flash start signal and the timing of start of the operation executed corresponding to a flash by the flash apparatus 300 is employed, the "operation executed corresponding to a flash by the flash apparatus 300" includes an operation related to the main exposure, such as a shutter drive operation or a diaphragm drive operation. In addition, the "operation executed corresponding to a flash by the flash apparatus 300" also includes a mirror-up operation, which is executed if the camera 200 is a single-lens reflex camera, and the light-metering operation executed by the light metering unit 204.

Further alternatively, each of the above-described first through the third exemplary embodiments can be modified as follows. More specifically, the processing for measuring the delay time can be executed by a flash apparatus 300 installed in the image pickup apparatus (camera) 200 or a communication apparatus instead of the image pickup apparatus (camera) 200.

More specifically, in this case, after receiving a flash start signal transmitted from the image pickup apparatus (camera) 200 to the slave apparatus, a microcomputer of the flash apparatus installed in the image pickup apparatus (camera) 200 activates a built-in timer. Furthermore, in this case, if a flash emitted by the slave apparatus has been detected by the light receiving unit of the flash apparatus 300, a timer value acquired at the timing of detection of the flash by the slave apparatus can be transmitted to the image pickup apparatus (camera) 200.

Now, a fourth exemplary embodiment of the present invention will be described in detail below. Configurations of the camera 200 and the flash apparatus 300 according to the present exemplary embodiment are the same as those of the first exemplary embodiment illustrated in FIGS. 2 and 3. Accordingly, the detailed description thereof will not be repeated here.

In the present exemplary embodiment, the flash apparatus 300 executes ACK flashing before the main flash that is executed according to the main flash start signal. After a predetermined time T has elapsed since the ACK flash, the flash apparatus 300 executes the main flashing.

A shooting operation executed by the camera 200 according to the present exemplary embodiment will be described in detail below with reference to a flow chart of FIG. 15 and a timing chart of FIG. 17. In the example illustrated in FIG. 17, an upper horizontal axis indicates a time axis for the camera 200 and a lower horizontal axis indicates a time axis for the flash apparatus 300.

Figure 15:
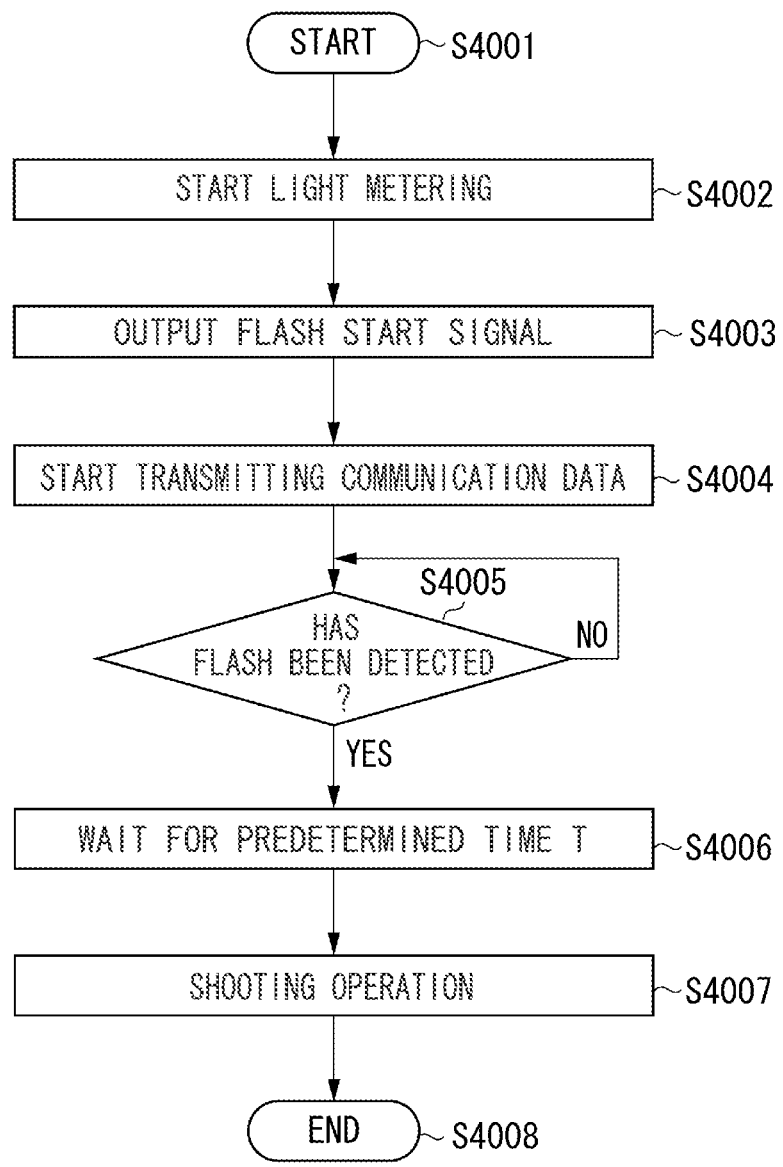
FIG. 15 is a flow chart illustrating an exemplary flow of a shooting operation executed by a camera according to a fourth exemplary embodiment of the present invention.

Referring to FIG. 15, in step S4001, if the user has input an instruction for starting a shooting operation by pressing the release switch of the operation unit 206, the camera 200 starts a routine for executing the shooting operation. In step S4002, the camera microcomputer 203 starts a light metering operation by using the light metering unit 204. Then the processing advances to step S4003.

In step S4003, the camera microcomputer 203 outputs a flash start signal to the radio communication unit 202. Then the processing advances to step S4004. A timing T4201 illustrated in FIG. 17 corresponds to the timing of output of the flash start signal.

In step S4004, the radio communication unit 202 modulates the flash start signal output by the camera microcomputer 203 into communication data and starts transmitting the communication data via the wireless communication antenna 201. A timing T4202 illustrated in FIG. 17 corresponds to the timing of starting the transmission of the communication data. At this timing, information about the predetermined time T, which is used for wait processing, is also transmitted. The wait processing will be described in detail below.

In the present exemplary embodiment, it is supposed that the information about the predetermined time T is included in the flash start signal output by the camera microcomputer 203. However, alternatively, the information about the predetermined time T can be output by the camera microcomputer 203 as a signal different from the flash start signal.

If the information about the predetermined time T is output by the camera microcomputer 203 as a signal different from the flash start signal, the present exemplary embodiment correctively handles the flash start signal and the signal of the information about the predetermined time T as a flash start signal. In other words, in the present exemplary embodiment, the "flash start signal" is a signal for instructing execution of a desired flash (a second flash) after the predetermined time T elapses after an ACK flash (a first flash) is executed, as will be described in detail below.

In step S4005, after transmitting the flash start signal via the radio communication unit 202 and the wireless communication antenna 201, the camera microcomputer 203 determines whether a flash detection signal from the light metering unit 204 has been detected. If it is determined that a flash detection signal from the light metering unit 204 has been detected (Yes in step S4005), then the processing advances to step S4006. A timing T4203 illustrated in FIG. 17 corresponds to the timing of detection of the flash detection signal from the light metering unit 204. If a variation of luminance equal to or greater than a predetermined value is detected within a predetermined time period, the light metering unit 204 outputs a flash detection signal to the camera microcomputer 203.

In step S4006, the camera microcomputer 203 operates the built-in timer and executes waiting processing according to the predetermined time T. The waiting processing in step S4006 is executed to synchronize the main exposure, which is executed in subsequent processing, with the main flash by the flash apparatus 300.

In the present exemplary embodiment, the same wait time is set for the camera 200 and the flash apparatus 300. However, alternatively, the wait time for the camera 200 can be set not only based on the predetermined time T but also based on the setting of the timing of executing a flash. In other words, if leading blade-synchronized shooting, in which the main flash is executed immediately after the start of the exposure, is executed, and supposing that the main flash is executed after the predetermined time T has elapsed after the timing of detection of an ACK flash (the ACK flash will be described in detail below), then the same wait time as the wait time for the camera 200 can be set as the wait time for the flash apparatus 300.

Furthermore, if trailing blade-synchronized shooting, in which the main flash is executed immediately before the start of the exposure, is executed, and supposing that the main flash is executed after the predetermined time T has elapsed after the timing of detection of an ACK flash, then the wait time for the camera 200 can be set based on the wait time for the flash apparatus 300 and the set exposure time.

In the present exemplary embodiment, the "start of the exposure" refers to a timing at which the entire imaging region of the image sensor starts undergoing the exposure by a travelling shutter (not illustrated). Furthermore, the "end of the exposure" refers to a timing at which at least a part of the imaging region of the image sensor finishes the exposure by the travelling shutter (not illustrated).

After the waiting processing ends, the processing advances to step S4007. In step S4007, the camera microcomputer 203 controls the imaging unit 205 to execute the main exposure (main shooting). A timing T4204 illustrated in FIG. 17 corresponds to the timing of executing the processing in step S4007. In step S4008, the sub routine of the shooting operation ends.

In the present exemplary embodiment, constant time is set as the predetermined time T. However, the present exemplary embodiment is not limited to this. More specifically, the predetermined time T can be set every time a flash start signal is output to the flash apparatus 300. In this case, information about the predetermined time T can be transmitted from the camera 200 to the flash apparatus 300 as well as the flash start signal.

Now, processing executed by the flash apparatus microcomputer 307 when a flash start signal is received via the antenna 309 and the radio communication unit 308 of the flash apparatus 300 will be described in detail below with reference to a flow chart of FIG. 16 and a timing chart of FIG. 17.

When the communication data generated by modulating the flash start signal input by the camera 200 is received via the antenna 309, the radio communication unit 308 of the flash apparatus 300 demodulates the received communication data and transmits the flash start signal to the flash apparatus microcomputer 307. A timing T4205 illustrated in FIG. 17 corresponds to the timing of reception of the communication data from the camera 200.

At this timing, the radio communication unit 308 also receives the information about the predetermined time T, which is to be used in the waiting processing, and transmits the received information about the predetermined time T to the flash apparatus microcomputer 307.

Figure 16:
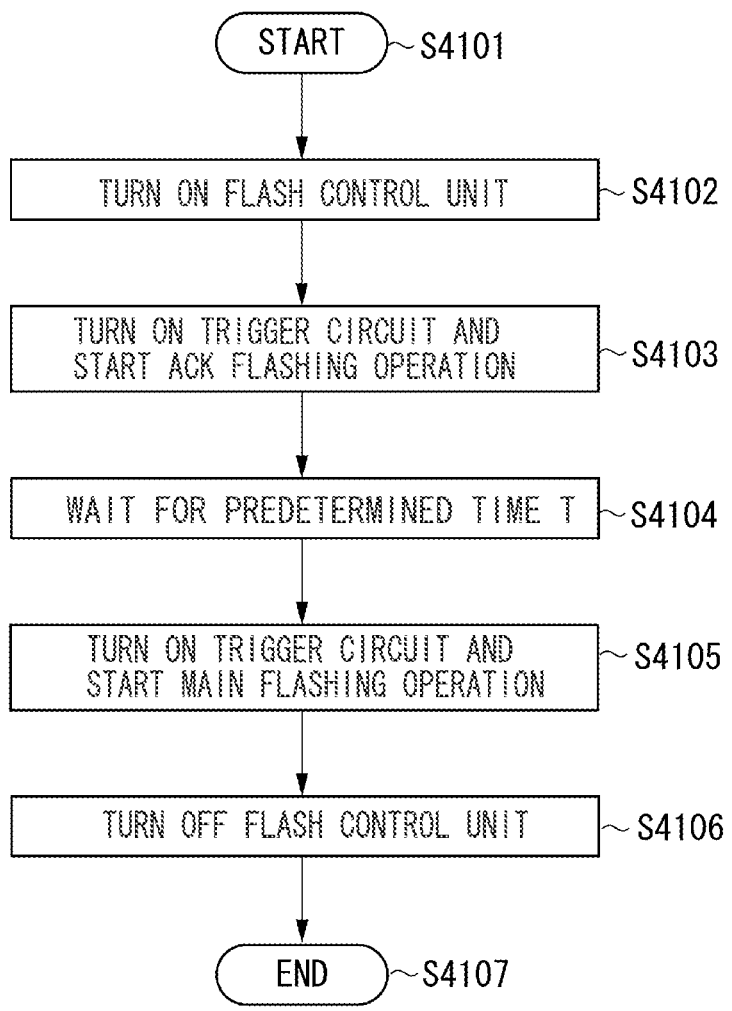
FIG. 16 is a flow chart illustrating an exemplary flashing sequence executed by a flash apparatus according to the fourth exemplary embodiment of the present invention.

After receiving the main flash start signal from the radio communication unit 308, in step S4101 illustrated in FIG. 16, the flash apparatus microcomputer 307 starts main flashing processing according to the received main flash start signal. In step S4102, the flash apparatus microcomputer 307 outputs an H signal to the flash control unit 306. Accordingly, the flash control unit 306 is turned on. In this manner, a discharge loop including an anode of the main condenser 303, the electric discharge tube 305, the flash control unit 306, and a cathode of the main condenser 303 is formed.

In step S4103, the flash apparatus microcomputer 307 outputs an H signal to the trigger circuit 304 for a predetermined time period. Accordingly, the trigger circuit 304 applies a high voltage to the electric discharge tube 305. Then, the electric discharge tube 305 starts ACK flashing.

The ACK flashing is a notification flash for notifying that a flash start signal has been received. If the ACK flashing, which is a notification flash, is detected, the camera 200 can recognize that the communication of the flash start signal has been normally executed.

After a predetermined time period has elapsed since then, the flash apparatus microcomputer 307 transmits an L signal to the flash control unit 306 to stop the ACK flash. A timing T4206 corresponds to the timing of execution of the ACK flash. The time from the emission of the ACK flash to the detection of the ACK flash by the camera 200 is not substantially delayed. Accordingly, in the example illustrated in FIG. 17, the timings T4203 and T4206 can be set at the same timing.

In step S4104, the flash apparatus microcomputer 307 operates the built-in timer and executes waiting processing according to the predetermined time T, which has been received from the camera 200. The waiting processing in step S4104 is executed to synchronize the main flashing, which is executed in subsequent processing, with the main exposure by the camera 200. In the present exemplary embodiment, the same time as the predetermined time T is set as the wait time used for the waiting processing by the flash apparatus 300.

In step S4104, during the waiting processing, the flash apparatus microcomputer 307 outputs an H signal to the flash control unit 306. Accordingly, the flash control unit 306 is turned on. In this manner, a discharge loop including an anode of the main condenser 303, the electric discharge tube 305, the flash control unit 306, and a cathode of the main condenser 303 is formed.

When the waiting processing ends, the processing advances to step S4105. In step S4105, the flash apparatus microcomputer 307 outputs an H signal to the trigger circuit 304 for a predetermined time period. Accordingly, the trigger circuit 304 applies a high voltage to the electric discharge tube 305. Then, the electric discharge tube 305 starts main flashing. A timing T4207 illustrated in FIG. 17 corresponds to the timing of start of the main flashing.

The flash amount of the main flash is determined by the camera microcomputer 203. In addition, the flash amount of the main flash is transmitted to the flash apparatus microcomputer 307 together with the flash start signal.

In step S4106, the flash apparatus microcomputer 307 outputs an L signal to the flash control unit 306. Accordingly, the flash control unit 306 is turned off. In this manner, the discharge loop including the anode of the main condenser 303, the electric discharge tube 305, the flash control unit 306, and the cathode of the main condenser 303 is disconnected. Then the electric discharge tube 305 stops the main flashing. In step S110, the main flashing operation ends.

As described above, in the present exemplary embodiment, the flash apparatus 300 executes the ACK flashing before the main flash, which is executed according to the main flash start signal. In addition, the flash apparatus 300 executes the main flash after the predetermined time T has elapsed since the timing of execution of the ACK flash. According to the present exemplary embodiment having the above-described configuration, the camera 200 can acquire and recognize the correct timing of start of the main flash.

In addition, in the present exemplary embodiment, after the wait time, which is set according to the predetermined time T, has elapsed after the ACK flash emitted by the flash apparatus 300 is detected, the camera 200 starts the main exposure.

Accordingly, the present exemplary embodiment can synchronize the main exposure and the main flash with a high accuracy.

In other words, because the camera 200 can determine that the main flash is executed after the predetermined time T has elapsed after the timing of detection of the ACK flash by the flash apparatus 300, the present exemplary embodiment can synchronize the main exposure and the main flash with a high accuracy.

Now, a fifth exemplary embodiment of the present invention will be described in detail below. Configurations of the camera 200 and the flash apparatus 300 according to the present exemplary embodiment are the same as those of the fourth exemplary embodiment illustrated in FIGS. 2 and 3. Accordingly, the detailed description thereof will not be repeated here.

In the present exemplary embodiment, the flash apparatus 300 executes ACK flashing, which is a flash for notifying that a flash start signal has been received. In addition, the flash apparatus 300 transmits an ACK signal, which is a notification signal for notifying that the flash start signal has been received, via the antenna 309 and the radio communication unit 308.

On the other hand, the camera 200 detects a flash and receives the ACK signal input by the flash apparatus 300. Based on the ACK signal received from the flash apparatus 300, the camera 200 determines that the ACK flash from the flash apparatus 300 has been detected.

With the configuration like this, the present exemplary embodiment can suppress or prevent wrongly detecting light emitted from a light source different from the intended flash apparatus 300 and determining that the ACK flashing has been executed based on the erroneously detected light. In addition, the present exemplary embodiment having the above-described configuration can detect that normal wireless communication by radio waves is not currently available due to an error, such as a communication error.

A shooting operation executed by the camera 200 according to the present exemplary embodiment will be described in detail below with reference to a flow chart of FIG. 18 and a timing chart of FIG. 20. In the example illustrated in FIG. 20, an upper horizontal axis indicates a time axis for the camera 200 and a lower horizontal axis indicates a time axis for the flash apparatus 300.

Figure 18:
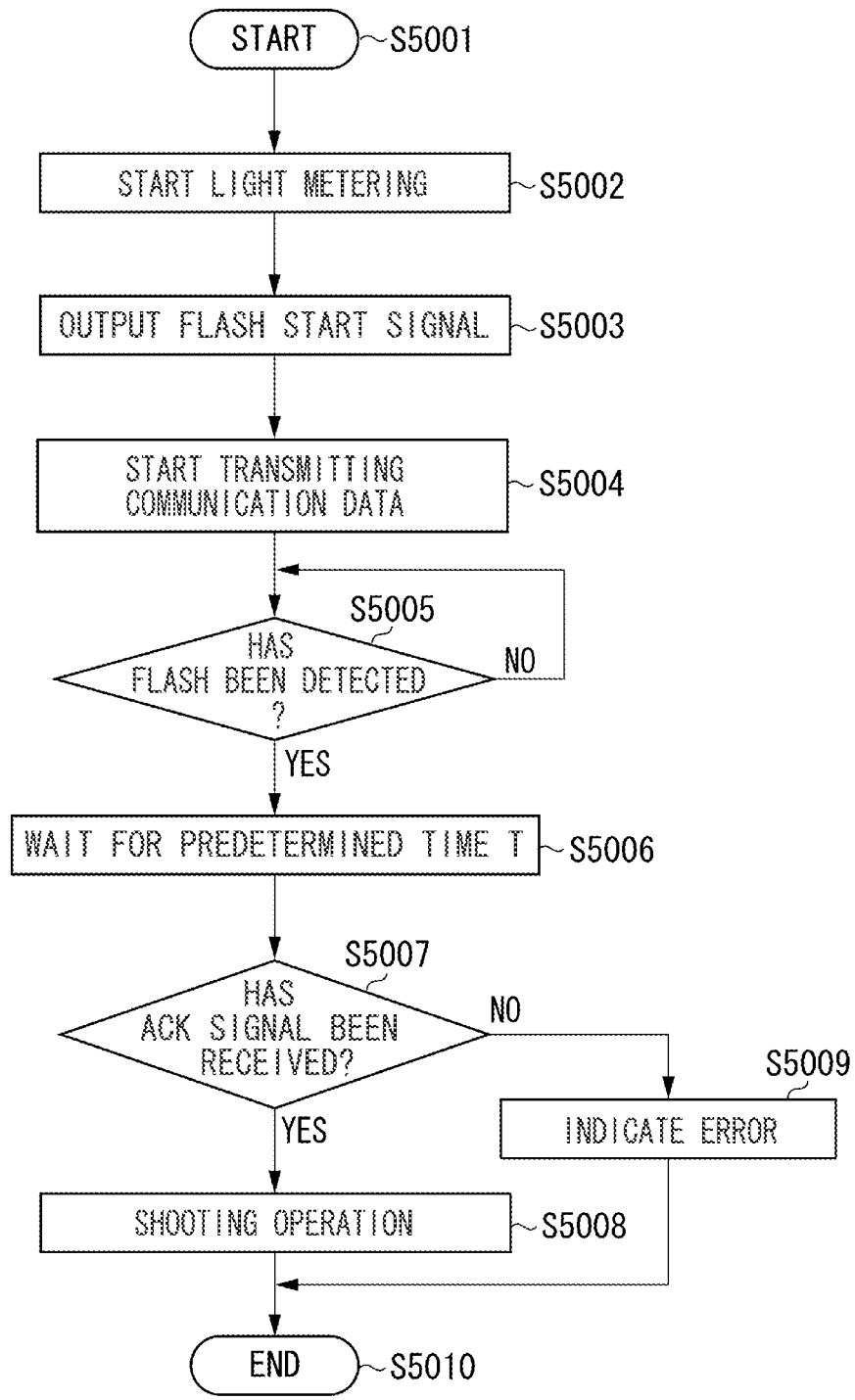
FIG. 18 is a flow chart illustrating an exemplary flow of a shooting operation executed by a camera according to a fifth exemplary embodiment of the present invention.

In addition, processing in steps S5001 through S5006 illustrated in FIG. 18 is similar to the processing in steps S4001 through S4006 described above with reference to FIG. 15 in the fourth exemplary embodiment, respectively. Accordingly, in the following description, the detailed description thereof will not be repeated here.

In step S5007, the camera microcomputer 203 determines whether an ACK signal input by the flash apparatus 300 has been received via the wireless communication antenna 201 and the radio communication unit 202 during the waiting processing in step S5006. If it is determined that the ACK signal has been received (Yes in step S5007), then the camera microcomputer 203 determines that the flash detected in step S5005 is an ACK flash emitted by the flash apparatus 300 and the processing advances to step S5008. In step S5008, the camera microcomputer 203 executes control for starting the shooting operation.

Figure 20:
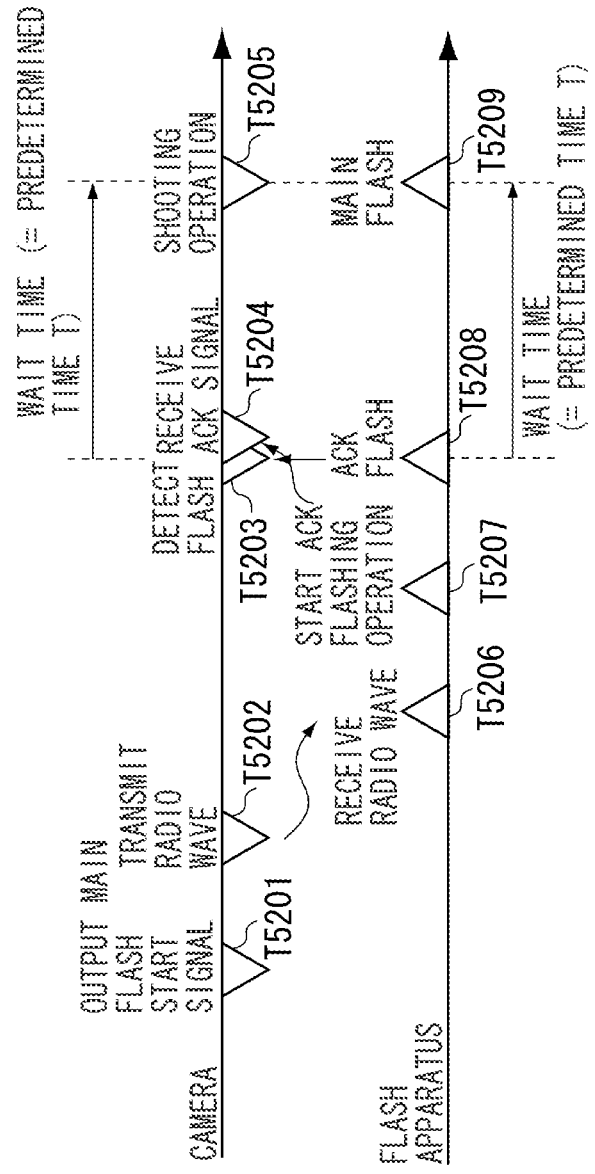
FIG. 20 is a timing chart illustrating exemplary timings of operations executed by the camera and the flash apparatus during shooting according to the fifth exemplary embodiment of the present invention.

A timing T5204 illustrated in FIG. 20 corresponds to the timing of reception of the ACK signal. Furthermore, a timing T5205 illustrated in FIG. 20 corresponds to the timing of start of the shooting operation.

On the other hand, if it is determined that no ACK signal has been received (No in step S5007), then the camera microcomputer 203 determines that the flash detected in step S5005 is not an ACK flash emitted by the flash apparatus 300 and the processing advances to step S5009. In step S5009, the camera microcomputer 203 executes error indication processing.

More specifically, in step S5009, an error flag can be set to indicate that an error has occurred. Alternatively, error information can be notified to a control IC (not illustrated) different from the camera microcomputer 203. Further alternatively, the processing can return to step S5002 or S5003. Yet further alternatively, a notification unit (not illustrated) can notify the user that no ACK signal has been received.

Now, processing executed by the flash apparatus microcomputer 307 when a flash start signal is received via the antenna 309 and the radio communication unit 308 of the flash apparatus 300 will be described in detail below with reference to a flow chart of FIG. 19 and a timing chart of FIG. 20.

Figure 17:
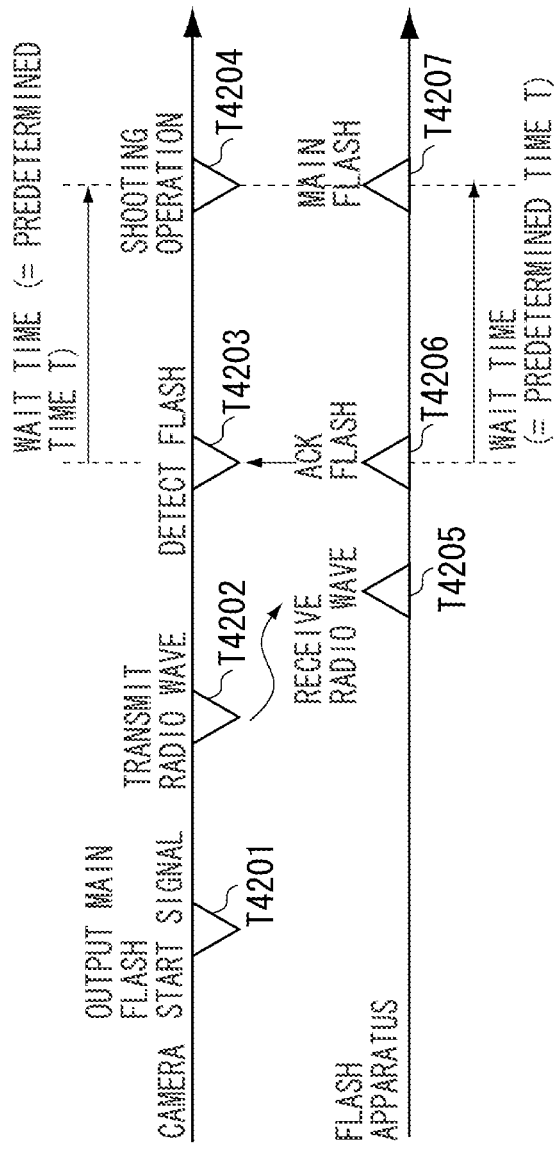
FIG. 17 is a timing chart illustrating exemplary timings of operations executed by the camera and the flash apparatus during shooting according to the fourth exemplary embodiment of the present invention.

In processing in steps other than processing in step S5103, the present exemplary embodiment executes the same processing as each corresponding processing described above in the above-described fourth exemplary embodiment with reference to FIG. 17. Accordingly, in the following description, the detailed description thereof will not be repeated here.

After having turned the flash control unit 306 on in step S5102, the processing advances to step S5103. In step S5103, the flash apparatus microcomputer 307 transmits an ACK signal, which notifies that the main flash start signal has been received, to the camera 200 via the radio communication unit 308 and the antenna 309. A timing T5208 illustrated in FIG. 20 corresponds to the timing of transmission of the ACK signal.

After transmitting the ACK signal, the processing advances to step S5104. In step S5104, the flash apparatus microcomputer 307 executes the ACK flashing.

As described above, in the present exemplary embodiment, the camera 200 receives the ACK signal from the flash apparatus 300 within the predetermined time period after the detection of the flash by the light metering unit 204. Accordingly, the camera 200 can determine that the detected flash is the ACK flash by the flash apparatus 300.

With the above-described configuration, the present exemplary embodiment can suppress or prevent wrongly detecting light emitted from a light source different from the intended flash apparatus 300 and determining that the ACK flashing has been executed based on the erroneously detected light. In addition, the present exemplary embodiment having the above-described configuration can synchronize the shooting operation with the main flash, with a high accuracy.

In addition, if no ACK signal is received during the waiting processing executed before the shooting operation, then the present exemplary embodiment can recognize that normal wireless communication by radio waves is not currently available due to an error, such as a communication error.

Figure 19:
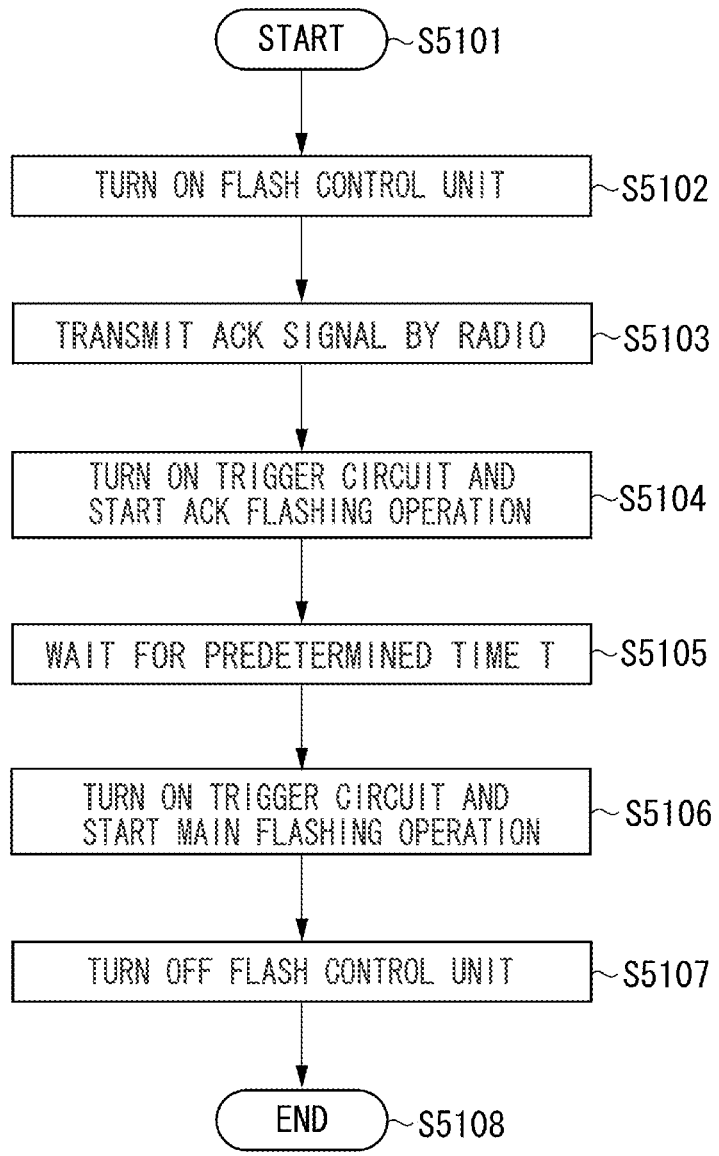
FIG. 19 is a flow chart illustrating an exemplary flashing sequence executed by a flash apparatus according to the fifth exemplary embodiment of the present invention.

In the present exemplary embodiment, the timing of the transmission of the ACK signal by the flash apparatus 300 is not limited to the timing illustrated in the flow chart of FIG. 19. Namely, the flash apparatus 300 can transmit the ACK signal at an arbitrary timing before step S5102 or after step S5104.

In the present exemplary embodiment, in step S5007, the camera microcomputer 203 determines whether an ACK signal has been received during the waiting processing. However, alternatively, time shorter than the wait time can be set as determination time and the camera microcomputer 203 can determine whether an ACK signal has been received before the set determination time elapses after the detection of the flash.

Further alternatively, the present exemplary embodiment can employ the following configuration. The present exemplary embodiment can set a predetermined time period around a reference timing of detection of the flash, as a determination time period. Furthermore, in this case, the camera microcomputer 203 can determine whether the ACK signal has been received within the set determination time period (predetermined time period).

In other words, in this case, the camera microcomputer 203 can determine whether a time difference between the detection of the flash and the detection of the ACK signal is within a predetermined value regardless of the order of the flash detection timing and the ACK signal reception timing.

As described above, the present exemplary embodiment can determine whether a time difference between the detection of the flash and the detection of the ACK signal is within a predetermined value. In this case, if the time difference between the detection of the flash and the detection of the ACK signal is within the predetermined value, then the present exemplary embodiment can determine that the detected flash is an ACK flash emitted by the flash apparatus 300. Accordingly, the present exemplary embodiment having the above-described configuration can suppress or prevent a wrong detection of the ACK flash.

Now, a sixth exemplary embodiment of the present invention will be described in detail below. Configurations of the camera 200 and the flash apparatus 300 according to the present exemplary embodiment are the same as those of the fourth exemplary embodiment illustrated in FIGS. 2 and 3. Accordingly, the detailed description thereof will not be repeated here.

In the present exemplary embodiment, restricted flash detectable time period is set to restrict a time period for detecting an ACK flash by the camera 200. With the configuration like this, the present exemplary embodiment can suppress or prevent wrongly detecting light emitted from a light source different from the intended flash apparatus 300 and determining that the ACK flashing has been executed based on the erroneously detected light.

In addition, if no flash is detected within the restricted flash detectable time period, the present exemplary embodiment having the configuration like this can recognize that the flash apparatus 300 cannot execute flashing even if a flash start signal is input to the flash apparatus 300 due to an error, such as a communication error.

A shooting operation executed by the camera 200 according to the present exemplary embodiment will be described in detail below with reference to a flow chart of FIG. 21 and a timing chart of FIG. 22. In the example illustrated in FIG. 22, an upper horizontal axis indicates a time axis for the camera 200 and a lower horizontal axis indicates a time axis for the flash apparatus 300.

Figure 21:
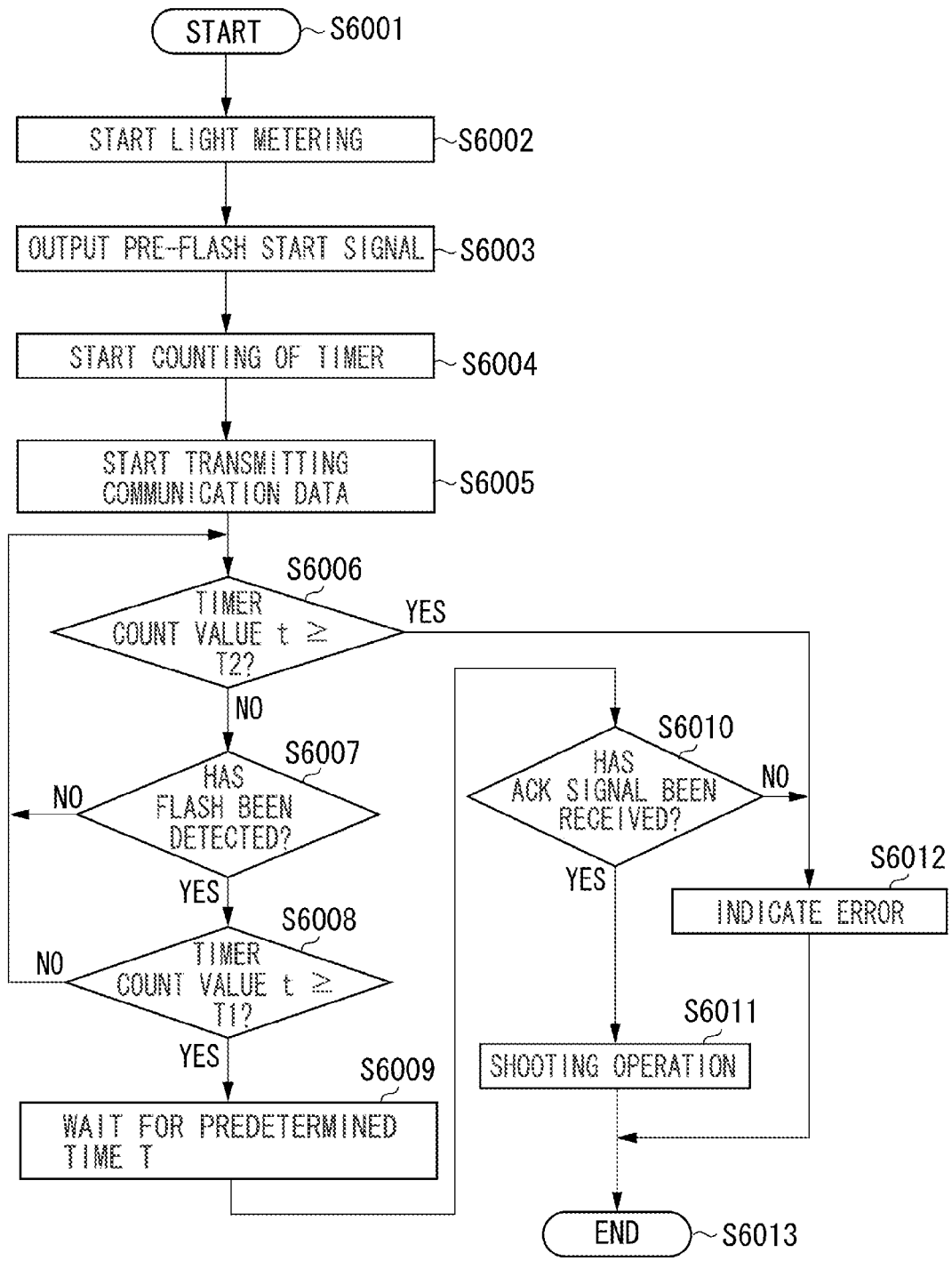
FIG. 21 is a flow chart illustrating an exemplary flow of a shooting operation executed by a camera according to a sixth exemplary embodiment of the present invention.

In addition, processing in steps S6001 through S6003 and S6009 through S6013 illustrated in FIG. 21 is similar to the processing in steps S5001 through S5003 and S5006 through S5010 described above with reference to FIG. 18 in the fifth exemplary embodiment, respectively. Accordingly, in the following description, the detailed description thereof will not be repeated here.

After outputting the flash start signal in step S6003, the processing advances to step S6004. In step S6004, the camera microcomputer 203 operates the built-in timer and starts counting of the elapsed time. A timing T6212 illustrated in FIG. 22 corresponds to the timing of operation of the timer.

In step S6005, the camera microcomputer 203 transmits the flash start signal to the flash apparatus 300 via the wireless communication antenna 201 and the radio communication unit 202. In step S6006, the camera microcomputer 203 determines whether the predetermined time T2 has elapsed after the timer operation starts. In other words, in step S6006, the camera microcomputer 203 determines whether a timer count value t, which indicates the elapsed time after the timer operation starts, is equal to or greater than the predetermined time T2.

If it is determined that the predetermined time T2 has not elapsed yet (No in step S6006), then the processing advances to step S6007. On the other hand, if it is determined that the predetermined time T2 has elapsed (Yes in step S6006), then the processing advances to step S6012. In step S6012, the camera microcomputer 203 executes error indication processing. If no flash is detected after the predetermined time T2 has elapsed as described above, the camera microcomputer 203 can determine that the flash apparatus 300 cannot execute flashing even if a flash start signal is input to the flash apparatus 300, due to an error, such as a communication error.

More specifically, in step S6012, an error flag can be set to indicate that an error has occurred. Alternatively, error information can be notified to a control IC (not illustrated) different from the camera microcomputer 203. Further alternatively, the processing can return to step S6002 or S6003. Yet further alternatively, a notification unit (not illustrated) can notify the user that an error has occurred.

In step S6007, the camera microcomputer 203 determines whether a flash has been detected by the light metering unit 204. If it is determined that a flash has been detected by the light metering unit 204 (Yes in step S6007), then the processing advances to step S6008. On the other hand, if it is determined that no flash has been detected by the light metering unit 204 (No in step S6007), then the processing returns to step S6006.

In step S6008, the camera microcomputer 203 determines whether the predetermined time T1 has elapsed after the timer operation has started. If it is determined that the predetermined time T1 has elapsed (Yes in step S6008), then the processing advances to step S6009. On the other hand, if it is determined that the predetermined time T1 has not elapsed yet (No in step S6008), then the camera microcomputer 203 determines that the light metering unit 204 has made a wrong detection and the processing returns to step S6006.

As described above, if a flash is detected by the light metering unit 204 before the predetermined timing of start of ACK flashing, the camera microcomputer 203 according to the present exemplary embodiment determines that the light metering unit 204 has wrongly detected light from another light source different from the intended flash apparatus 300. In this case, the camera microcomputer 203 waits until ACK flashing is executed again. With the above-described configuration, the present exemplary embodiment can detect an ACK flash with a high accuracy.

The predetermined time T1 and the predetermined time T2 have a relationship "T1<T2" as illustrated in FIG. 22. In addition, a time period whose elapsed time after the timing at which the operation of the timer is started is equal to or longer than the predetermined time T1 and shorter than the predetermined time T2, is set as the restricted flash detectable time period.

In the processing executed by the flash apparatus microcomputer 307 when a flash start signal is received via the antenna 309 and the radio communication unit 308 of the flash apparatus 300, the present exemplary embodiment executes the same processing as that executed by the fifth exemplary embodiment described above. Accordingly, the detailed description thereof will not be repeated here.

As described above, in the present exemplary embodiment, the restricted flash detectable time period for restricting the time period during which the light metering unit 204 can execute flash detection processing is set. If any flash is detected outside the restricted flash detectable time period, the camera microcomputer 203 determines that the detected flash is light emitted from another light source different from the intended flash apparatus 300. With the above-described configuration, the present exemplary embodiment can suppress or prevent a wrong detection of an ACK flash by the light metering unit 204.

Accordingly, the present exemplary embodiment having the above-described configuration can detect the ACK flash with a high accuracy. In addition, the present exemplary embodiment can synchronize the timing of exposure by the image pickup apparatus (camera) 200 with the timing of flashing by the flash apparatus 300, with a high accuracy.

According to the present exemplary embodiment, if no flash is detected within the restricted flash detectable time period, the camera microcomputer 203 can determine that the flash apparatus 300 cannot execute flashing even if a flash start signal is input to the flash apparatus 300 due to an error, such as a communication error. In addition, if any flash is detected within the restricted flash detectable time period but the camera 200 has received no ACK signal during the waiting processing, then the camera microcomputer 203 determines that the detected flash is light emitted from another light source different from the intended flash apparatus 300. Accordingly, the present exemplary embodiment having the above-described configuration can suppress or prevent a wrong detection of an ACK flash by the light metering unit 204.

In addition, if no ACK signal is received during the waiting processing executed before the shooting operation, then the present exemplary embodiment can recognize that normal wireless communication by radio waves is not currently available due to an error, such as a communication error.

As in the fifth exemplary embodiment described above, the timing of the transmission of the ACK signal by the flash apparatus 300 is not limited to the timing illustrated in the flow chart of FIG. 19. The flash apparatus 300 can transmit the ACK signal at an arbitrary timing before step S5102 or after step S5104.

In the present exemplary embodiment, in step S6010, the camera microcomputer 203 determines whether an ACK signal has been received during the waiting processing. However, alternatively, time shorter than the wait time can be set as determination time and the camera microcomputer 203 can determine whether an ACK signal has been received before the set determination time elapses after the detection of the flash.

Further alternatively, the present exemplary embodiment can employ the following configuration. The present exemplary embodiment can set a predetermined time period around a reference timing of detection of the flash, as a determination time period. Furthermore, in this case, the camera microcomputer 203 can determine whether the ACK signal has been received within the set determination time period.

More specifically, in this case, the camera microcomputer 203 can determine whether a time difference between the detection of the flash and the detection of the ACK signal is within a predetermined value instead regardless of the order of the flash detection timing and the ACK signal reception timing.

As described above, the present exemplary embodiment can determine whether a time difference between the detection of the flash and the detection of the ACK signal is within a predetermined value. In this case, if the time difference between the detection of the flash and the detection of the ACK signal is within the predetermined value, then the present exemplary embodiment can determine that the detected flash is an ACK flash emitted by the flash apparatus 300. Accordingly, the present exemplary embodiment having the above-described configuration can suppress or prevent a wrong detection of the ACK flash.

Alternatively, the restricted flash detectable time period can be set as a determination time period for determining whether an ACK signal has been received. Furthermore, the timing at which the operation of the timer is started is not limited to the timing illustrated in the flow chart of FIG. 21. In other words, the operation of the timer can be started at an arbitrary timing before step S6002 or after step S6005.

In addition, because a time period in which an ACK flash is likely to start is set as the predetermined time T1 and the predetermined time T2, the predetermined time T1 and the predetermined time T2 can be changed according to a communication method and a communication rate.

In addition, by using an ACK signal that can be transmitted by radio waves, a wrong detection of an ACK flash can be more effectively suppressed or prevented. However, the fourth exemplary embodiment described above, which does not execute processing for detecting an ACK signal, can also effectively suppress or prevent a wrong detection of an ACK flash by setting and using the restricted flash detectable time period.

In each of the above-described embodiments, by using an ACK flash as a pre-flash to determine the amount of the main flash, the decrease of the charging voltage supplied to the main condenser 303 can be effectively suppressed before the main flash. Therefore, shortage of charging voltage at the time of the main flash can be effectively prevented. In addition, because the flashing is executed only once before the main flash, a release time lag can be effectively suppressed.

Each of the above-described embodiments executes the ACK flashing before the main flashing. However, the ACK flashing can also be executed before the pre-flashing. After receiving the pre-flash start signal from the camera 200, the flash apparatus 300 executes the ACK flashing to notify the user that the pre-flash start signal has been received.

If the ACK flash is detected, the camera 200 can determine that a pre-flash is to be executed after the predetermined time period has elapsed after the detection of the ACK flash. In this case, alternatively, the flash apparatus 300 can set the sensitivity of the light metering unit 204 during the pre-flashing or the amount of flash of the pre-flash by the light metering unit 204 according to a result of the metering of light at the time of the ACK flash.

By setting the sensitivity of the light metering unit 204 at the time of the pre-flash or the amount of pre-flash by the light metering unit 204 according to a result of the metering of light at the time of the ACK flash as described above, the present exemplary embodiment having the above-described configuration can execute the light metering operation during the pre-flash with a high accuracy. Accordingly, the present exemplary embodiment can determine a very appropriate amount of the main flash.

Each of the above-described embodiments executes the ACK flashing before the main flash. However, the ACK flash, the pre-flash, and the main flash can be executed in this order according to one received flash start signal only.

In this case, each of first wait time, which includes a time period from the timing of the ACK flash to the timing of the pre-flash and second wait time, which includes a time period from the timing of the pre-flash to the timing of the main flash, or third wait time, which includes a time period from the timing of the ACK flash to the timing of the main flash, can be set to each of the camera 200 and the flash apparatus 300.

Each of the above-described embodiments executes the flash detection processing by using the light metering unit

204. However, the present invention is not limited to this. More specifically, the flash detection processing can be implemented by using an image photographed by the image sensor.

In other words, in this case, after transmitting the flash start signal to the flash apparatus 300, the camera 200 can execute continuous shooting at a high speed. Furthermore, the camera 200 can select an image based on which a pre-flash emitted by the flash apparatus 300 can be identified from among the images photographed by the continuous shooting. In addition, in this case, the wait time can be set by using the timing of shooting of the images as the reference timing thereof.

Each of the above-described exemplary embodiments of the present invention can be modified as follows. More specifically, a flash apparatus installed in the image pickup apparatus (camera) 200 or a communication apparatus can set the predetermined time used for the waiting processing for the slave apparatus instead of the image pickup apparatus (camera) 200.

More specifically, in this case, a microcomputer of the flash apparatus installed in the image pickup apparatus (camera) 200 can set the predetermined time used for the waiting processing for the slave apparatus and notifies the set predetermined time period to both the image pickup apparatus (camera) 200 and the slave apparatus.

In each of the first through the sixth exemplary embodiments of the present invention, the flash apparatus 300, which includes the electric discharge tube 305 as a flash unit is used as the flash apparatus. However, the present invention is not limited to this. More specifically, another different flash apparatus that uses another different flash unit, such as a light-emitting diode (LED), can be used to implement the present invention.

In addition, in each of the first through the sixth exemplary embodiments of the present invention, the image pickup apparatus (camera) 200 includes the radio communication unit 202 and the wireless communication antennas 201 and 309. However, the present invention can also be implemented by a different image pickup apparatus in which a communication apparatus capable of executing wireless communication with the flash apparatus by radio waves is installed.

Similarly, if the flash apparatus includes neither a radio communication unit nor an antenna and a communication apparatus capable of executing wireless communication with the image pickup apparatus (camera) 200 by radio waves is installed in the flash apparatus, the flash apparatus can also implement the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-020364 filed Feb. 1, 2010 and No. 2010-020365 filed Feb. 1, 2010, which are hereby incorporated by reference herein in their entirety.

What is claimed is:

1. An image pickup apparatus configured to execute wireless communication with a flash apparatus by radio waves via a communication unit, the image pickup apparatus comprising:
 a signal output unit configured to output a start signal to make the flash apparatus emit light;
 a detection unit configured to detect light emitted by the flash apparatus according to the start signal;
 an acquisition unit configured to acquire a time difference between a predetermined reference timing and a timing determined based on a result of detecting the light by the detection unit; and
 a control unit configured to control at least one of a timing of output of the start signal by the signal output unit and a timing of start of an operation executed corresponding to emitting light by the flash apparatus according to the time difference acquired by the acquisition unit.

2. The image pickup apparatus according to claim 1, wherein the predetermined reference timing is a timing at which the start signal is output from the signal output unit to the communication unit.

3. The image pickup apparatus according to claim 1, wherein the predetermined reference timing is a timing at which a radio signal corresponding to the start signal is output by the communication unit.

4. The image pickup apparatus according to claim 1, wherein the predetermined reference is a timing at which arbitrarily set predetermined time has elapsed after the start signal is output by the signal output unit.

5. The image pickup apparatus according to claim 1,
 wherein the detection unit is configured to measure a luminance of an object and configured to detect light emitted by the flash apparatus according to a variation of the luminance of the object measured by the detection unit, and
 wherein the acquisition unit is configured to acquire the time difference between the predetermined reference timing and a timing of detection by the detection unit.

6. The image pickup apparatus according to claim 1,
 wherein the detection unit is configured to measure the luminance of the object, and
 wherein the acquisition unit is configured to acquire the time difference between the predetermined reference timing and a timing at which a variation of the luminance of the object equal to or greater than a predetermined value is detected within predetermined time.

7. The image pickup apparatus according to claim 1,
 wherein the detection unit is configured to detect light emitted by the flash apparatus according to a plurality of images continuously shot by an imaging unit, and
 wherein the acquisition unit is configured to acquire the time difference between the predetermined reference timing and a timing determined based on an ordinal position of an image based on which light emitted by the flash apparatus is detected by the detection unit, among the continuously photographed images.

8. The image pickup apparatus according to claim 1,
 wherein the acquisition unit is configured to acquire the time difference between the predetermined reference timing and a timing at which a pre-flash is regarded to have been emitted by the flash apparatus according to the start signal, and
 wherein the control unit is configured to control a timing of starting an exposure operation, which is executed corresponding to a main flash by the flash apparatus, according to the time difference acquired by the acquisition unit.

9. The image pickup apparatus according to claim 1,
 wherein the acquisition unit is configured to acquire the time difference between the predetermined reference timing and a timing at which a pre-flash is regarded to have been emitted by the flash apparatus according to the start signal, and
 wherein the control unit is configured to control a timing of outputting a start signal for starting the main flash, from the signal output unit to the flash apparatus according to the time difference acquired by the acquisition unit.

10. The image pickup apparatus according to claim 1, further comprising a determination unit configured to determine whether the light detected by the detection unit is light emitted by the flash apparatus.

11. The image pickup apparatus according to claim 10, wherein the determination unit is configured, if light is detected by the detection unit within a predetermined time period from a reference timing of output of the start signal by the signal output unit, to determine that the detected light is the light emitted by the flash apparatus.

12. The image pickup apparatus according to claim 10, wherein the determination unit is configured, if an identification signal, which is transmitted from the flash apparatus and indicates that the flash apparatus has emitted light, is received via the communication unit within predetermined time after the light is detected by the detection unit, to determine that the detected light is light emitted by the flash apparatus.

13. The image pickup apparatus according to claim 10, wherein the determination unit is configured, if light is detected by the detection unit and if the identification signal, which is transmitted from the flash apparatus and indicates that the flash apparatus has emitted light, is received via the communication unit within the predetermined time period from the reference timing of output of the start signal by the signal output unit, to determine that the detected light is light emitted by the flash apparatus.

14. A camera system including an image pickup apparatus and a flash apparatus configured to execute wireless communication by radio waves via a communication unit, the camera system comprising:
 a signal output unit configured to output a start signal to make the flash apparatus emit light;
 a detection unit configured to detect light emitted by the flash apparatus according to the start signal;
 an acquisition unit configured to acquire a time difference between a predetermined reference timing and a timing determined based on a result of detecting the light by the detection unit; and
 a control unit configured to control at least one of a timing of output of the start signal by the signal output unit and a timing of start of an operation executed corresponding to emitting light by the flash apparatus according to the time difference acquired by the acquisition unit.

* * * * *